US011133858B2

United States Patent
Fujii et al.

(10) Patent No.: US 11,133,858 B2
(45) Date of Patent: Sep. 28, 2021

(54) FEEDER LINK COMMUNICATION SYSTEM OF HAPS

(71) Applicant: HAPSMobile Inc., Tokyo (JP)

(72) Inventors: Takafumi Fujii, Tokyo (JP); Teruya Fujii, Tokyo (JP)

(73) Assignee: HAPSMobile Inc., Tokyo (JP)

(*) Notice: Subject to any disclaimer, the term of this patent is extended or adjusted under 35 U.S.C. 154(b) by 0 days.

(21) Appl. No.: 17/271,081

(22) PCT Filed: Aug. 7, 2019

(86) PCT No.: PCT/JP2019/031189
§ 371 (c)(1),
(2) Date: Feb. 24, 2021

(87) PCT Pub. No.: WO2020/045007
PCT Pub. Date: Mar. 5, 2020

(65) Prior Publication Data
US 2021/0250083 A1    Aug. 12, 2021

(30) Foreign Application Priority Data
Aug. 27, 2018  (JP) .............................. JP2018-158719

(51) Int. Cl.
*H04W 4/00*    (2018.01)
*H04B 7/185*   (2006.01)
(Continued)

(52) U.S. Cl.
CPC ....... *H04B 7/18504* (2013.01); *H04B 7/0456* (2013.01); *H04B 7/0602* (2013.01);
(Continued)

(58) Field of Classification Search
CPC .................. H04B 7/18504; H04B 7/0456; H04B 7/0602; H04B 7/18521; H04B 7/2041;
(Continued)

(56) References Cited

U.S. PATENT DOCUMENTS 8,078,101 B2 * 12/2011 Karabinis .............. H04B 7/216
455/12.1
8,116,763 B1 *  2/2012 Olsen .................... H04W 16/28
455/431

(Continued)

FOREIGN PATENT DOCUMENTS

CN       107947849 A  *  4/2018
JP       2001-308770 A    11/2001
(Continued)

*Primary Examiner* — Mahendra R Patel
(74) *Attorney, Agent, or Firm* — Muirhead and Saturnelli, LLC

(57) ABSTRACT

Provide a system capable of improving a frequency utilization efficiency of a feeder link of an aerial-floating type communication relay apparatus. A system, which has an aerial-staying type communication relay apparatus that wirelessly communicates with a terminal apparatus, is provided with plural gateway stations that perform space-division multiplexing communication for transmitting and receiving different relay signals from each other on a same frequency in a feeder link with the aerial-stay type communication relay apparatus. Each of the plural gateway stations may be provided with an antenna control section that controls an antenna for feeder link so as to track the aerial-stay type communication relay apparatus.

13 Claims, 24 Drawing Sheets

(51) Int. Cl.
  *H04B 7/06* (2006.01)
  *H04B 7/0456* (2017.01)
  *H04W 84/06* (2009.01)
  *H04B 7/204* (2006.01)
  *H04W 16/26* (2009.01)

(52) U.S. Cl.
  CPC ....... *H04B 7/18521* (2013.01); *H04B 7/2041* (2013.01); *H04W 16/26* (2013.01); *H04W 84/06* (2013.01)

(58) Field of Classification Search
  CPC .. H04B 7/18513; H04B 7/026; H04B 7/0617; H04B 7/18508; H04B 7/18515; H04W 16/26; H04W 84/06
  USPC ......................................................... 455/431
  See application file for complete search history.

(56) References Cited

U.S. PATENT DOCUMENTS

| | | | | |
|---|---|---|---|---|
| 9,042,295 | B1* | 5/2015 | Balter | H04B 7/18515 370/317 |
| 10,560,955 | B2* | 2/2020 | Shoshan | H04B 7/15542 |
| 10,574,355 | B2* | 2/2020 | Dimitrov | H04B 7/1851 |
| 10,917,166 | B2* | 2/2021 | Gaske | H04B 7/18541 |
| 11,018,756 | B2* | 5/2021 | Buer | H04B 7/024 |
| 2005/0143005 | A1* | 6/2005 | Moore, III | H04B 7/18513 455/13.1 |
| 2005/0288011 | A1* | 12/2005 | Dutta | H04B 7/18539 455/13.3 |
| 2012/0155341 | A1* | 6/2012 | Yamamoto | H04B 7/086 370/281 |
| 2013/0102254 | A1* | 4/2013 | Cyzs | H04B 1/525 455/63.1 |
| 2014/0192854 | A1* | 7/2014 | Umeda | H04L 25/0232 375/232 |
| 2015/0131703 | A1* | 5/2015 | Balter | H04B 7/18508 375/133 |
| 2016/0046387 | A1* | 2/2016 | Frolov | B64B 1/00 244/59 |
| 2016/0278033 | A1* | 9/2016 | Wu | H04B 7/18513 |
| 2016/0381596 | A1* | 12/2016 | Hu | H04B 7/022 370/236 |
| 2018/0083694 | A1* | 3/2018 | Rajagopalan | H04L 1/1816 |
| 2018/0102832 | A1* | 4/2018 | Chang | H04B 7/18506 |
| 2018/0331738 | A1* | 11/2018 | Agrawal | H04B 7/0802 |
| 2019/0260462 | A1* | 8/2019 | Axmon | H04B 7/2041 |

FOREIGN PATENT DOCUMENTS

| | | | | |
|---|---|---|---|---|
| JP | 2009-505499 | A | 2/2009 | |
| JP | 2013-519294 | A | 5/2013 | |
| WO | WO-2018075962 | A1* | 4/2018 | ......... H04B 7/18517 |
| WO | WO 2020/023224 | A1 | 7/2019 | |

* cited by examiner

FEEDER LINK COMMUNICATION SYSTEM OF HAPS

TECHNICAL FIELD

The present invention relates to a feeder link communication system in an aerial-floating type radio relay apparatus such as a HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace (for example, see Patent Literature 1). A communication line in this aerial-floating type communication relay apparatus is configured with a feeder link between the communication relay apparatus and a gateway (GW) station on a mobile communication network side, and a service link between the communication relay apparatus and a terminal apparatus.

CITATION LIST

Patent Literature

Patent Literature 1: U.S. Patent Application Publication No. 2016/0046387.

SUMMARY OF INVENTION

Technical Problem

Since a communication capacity of the service link of the aerial-floating type communication relay apparatus is determined by a communication capacity of the feeder link which is the relay frequency, improvement of the frequency effective efficiency of the feeder link has become an issue.

Solution to Problem

A system according to an aspect of the present invention is a system having an aerial-staying type communication relay apparatus that wirelessly communicates with a terminal apparatus. This system comprises plural gateway stations for transmitting and receiving relay signals different from each other on a same frequency in feeder links between the aerial-staying type communication relay apparatus and the plural gateway stations.

In the foregoing system, each of the plural gateway stations may comprise an antenna control section for controlling an antenna for feeder link so as to track the aerial-staying type communication relay apparatus.

In the foregoing system, the aerial-staying type communication relay apparatus may comprise an antenna for feeder link having plural directional beams respectively corresponding to the plural gateway stations, and an antenna control section for controlling the antenna for feeder link so that each of the plural beams directs toward a corresponding gateway station.

The foregoing antenna for feeder link may be a plurality of antennas for feeder link having directional beams in different directions from each other, and the foregoing antenna control section may mechanically control each of the plurality of antennas for feeder link so that each of the directional beams of the plurality of antennas for feeder link is directed toward a corresponding gateway station.

In the foregoing system, the antenna for feeder link is an array antenna capable of forming the plural directional beams in an arbitrary outward direction centered on a virtual axis in a vertical direction, and the foregoing antenna control section controls amplitudes and phases of transmission/reception signals for the plural antenna elements of the array antenna so that each of the plural directional beams is directed toward a corresponding gateway station.

In the foregoing system, the antenna for feeder link may be a plurality of array antennas capable of forming directional beams in predetermined angle ranges centered on different directions from each other, and the antenna control section may selectively perform a control of amplitudes and phases of transmission/reception signals for plural antenna elements of each of the plurality of array antenna and a switching control of the plurality of array antennas, so that each of the directional beams of the plurality of array antennas is directed toward a corresponding gateway station.

In the foregoing system, the aerial-staying type communication relay apparatus may comprise an interference suppression section that suppresses interference between the plural feeder links that are formed between the plural gateway stations and the aerial-staying type communication relay apparatus.

In the foregoing system, the plural gateway stations may be controlled so as to be in a time synchronization with each other with respect to a transmission timing, and the foregoing interference suppression section may calculate, for each of the plural gateway stations, a weight for suppressing an interference signal causing an interference, the interference being caused by a transmission signal transmitted from the gateway station and received by a directional beam corresponding to another gateway station, and may subtract, for each of the plural gateway stations, a reception signal received by a directional beam corresponding to another gateway station multiplied by the weight corresponding to the other gateway station from the reception signal received by the directional beam corresponding to each of the gateway stations.

In the foregoing system, each of the plural gateway stations may transmit a pilot signal, and the foregoing interference suppression section may estimate propagation path responses by calculating plural path differences between each of the plural gateway stations and the antenna for feeder link of the communication relay apparatus based on a reception result of the pilot signal received from each of the plural gateway stations, and may calculate plural weights respectively corresponding to each of the plural gateway stations based on the plural propagation path responses.

In the foregoing system, the interference suppression section may estimate the plural propagation path responses and calculate the plural weights, at a center frequency of a transmission signal band of the feeder link or a frequency around the center frequency.

In the foregoing system, the plural pilot signals may be located in guard bands located on both sides of the transmission signal band of the feeder link, or may be located at a center frequency of the transmission signal band of the feeder link or a frequency around the center frequency.

In the foregoing system, the plural pilot signals may be transmitted at different frequencies from each other.

In the foregoing system, the pilot signals may be transmitted from each of the plural gateway stations.

In the foregoing system, each of the plural weights may be calculated by the ZF (Zero-Forcing) method or the MMSE (Minimum Mean Square Error) method using matrix of the propagation path response.

Advantageous Effects of Invention

According to the present invention, it is possible to improve a frequency utilization efficiency of a feeder link of an aerial-floating type communication relay apparatus.

DESCRIPTION OF EMBODIMENTS

Hereinafter, embodiments of the present invention are described with reference to the drawings.

Figure 1:
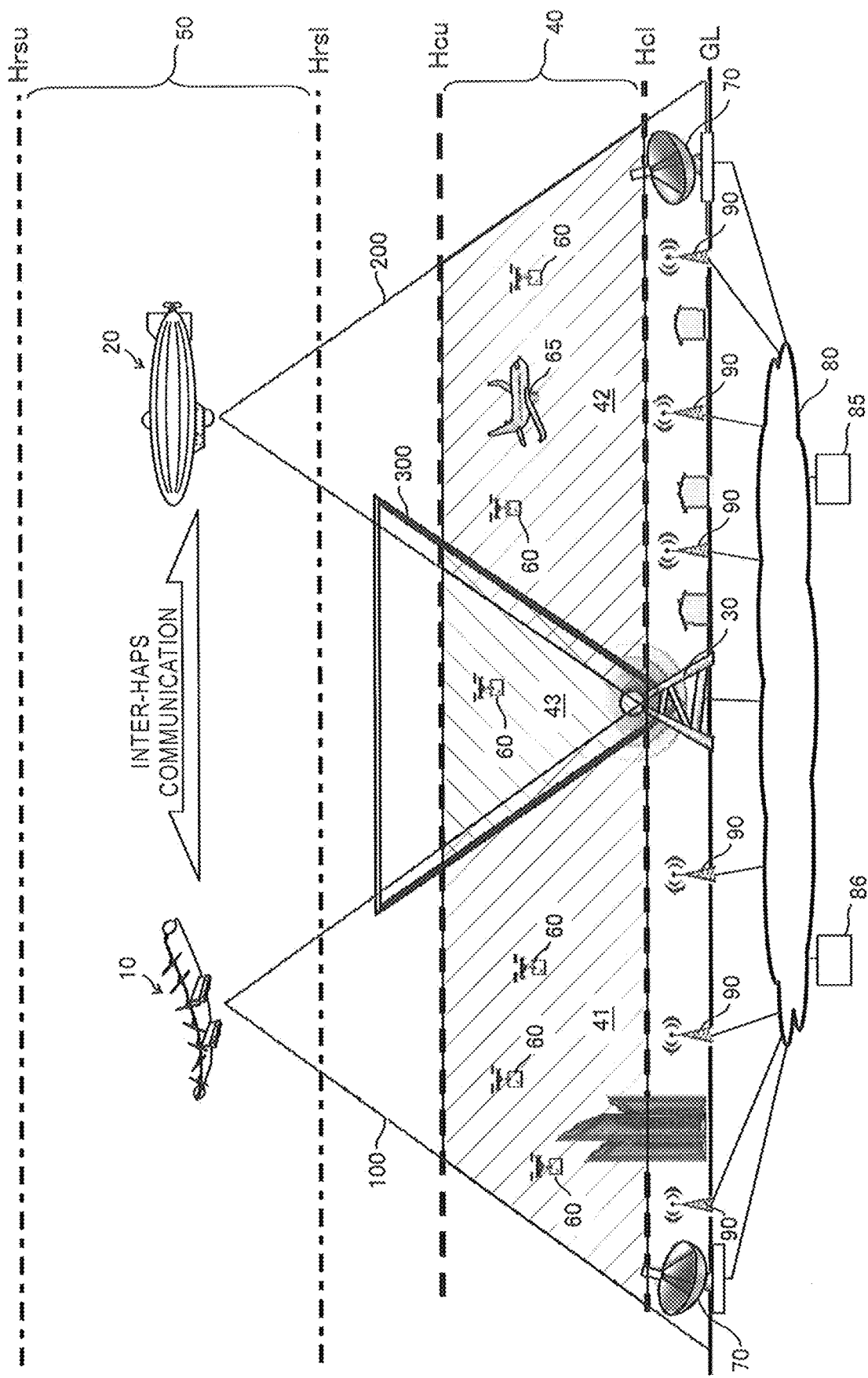
FIG. 1 is a schematic configuration diagram showing an example of an overall configuration of a communication system that realizes a three-dimensional network according to an embodiment of the present invention.

FIG. 1 is a schematic configuration diagram showing an example of an overall configuration of a communication system according to an embodiment of the present invention.

The communication system according to the present embodiment is suitable for realizing a three-dimensional network for mobile communications of the fifth generation or the next and subsequent generations after the fifth generation, which supports a simultaneous connection to a large number of terminal apparatuses, low delay method, etc. It is noted that, mobile communication standards applicable to communication systems, relay communication stations, base stations, repeaters and terminal apparatuses disclosed herein include the mobile communication standard of the fifth generation and the mobile communication standards of the next and subsequent generations after the fifth generation.

As shown in FIG. 1, the communication system is provided with High-Altitude Platform Stations (HAPSs) 10 and 20 as plural aerial-floating type communication relay apparatuses (radio relay apparatuses). The HAPSs 10 and 20 are located in an airspace at a predetermined altitude, and form three-dimensional cells (three-dimensional areas) 41 and 42 as indicated by hatching areas in the figure in a cell-formation target airspace 40 at a predetermined altitude. The HAPSs 10 and 20 are those in which relay communication stations are mounted on floating objects (for example, solar plane, airship) that are controlled by autonomous control or external control so as to float or fly and be located in an airspace (floating airspace) 50 with high altitude of 100 [km] or less from the ground level or the sea level.

The airspace 50 in which the HAPSs 10 and 20 are located is, for example, a stratospheric airspace with altitude greater than 11 [km] and less than 50 [km] on the ground (or on the water such as the sea or lake). The airspace 50 may be an airspace in an altitude of 15 [km] or more and 25 [km] or less where weather conditions are relatively stable, and may be an airspace with altitude of about 20 [km] in particular. Each of Hrsl and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or two or more HAPSs according to the communication system in the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation spatial area near the ground level covered by a base station (for example, LTE eNodeB) 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell in the present embodiment is formed may be an airspace over the sea, a river, or a lake.

The relay communication stations of the HAPSs 10 and 20 respectively form beams 100 and 200 toward the ground for wirelessly communicating with a terminal apparatus that is a mobile station. The terminal apparatus may be a communication terminal module incorporated in a drone 60 that is an aircraft such as a small helicopter capable of remotely steering, or may be a user apparatus used by a user in an airplane 65. The spatial areas through which the beams 100 and 200 pass in the cell-formation target airspace 40 are three-dimensional cells 41 and 42. The plural beams 100 and 200 adjacent to each other in the cell-formation target airspace 40 may be partially overlapped with each other.

Each of the relay communication stations of the HAPSs 10 and 20 is, for example, a base station that wirelessly communicates with a gateway station (also referred to as a "feeder station") 70 as a relay station connected to a core network on the ground (or on the sea) side, or a slave repeater that wirelessly communicates with the feeder station (master repeater) 70 as a relay station connected to the base station on the ground (or on the sea) side. Each of the relay communication stations of the HAPSs 10 and 20 is connected to a core network of a mobile communication network 80 via the feeder station 70 installed on the ground or on the sea. A communication between the HAPSs 10 and 20 and the feeder station 70 may be performed by a radio communication with radio waves such as microwaves, or may be performed by an optical communication using a laser light or the like.

Each of the HAPSs 10 and 20 may autonomously control its own floating movement (flight) and a process in the relay communication station, by executing a control program with a control section including a computer or the like incorporated inside of the HAPS. For example, each of the HAPSs 10 and 20 may acquire its own current position information (for example, GPS position information), position control information (for example, flight schedule information) stored in advance, position information on another HAPS located in a peripheral space or the like, and may autonomously control floating movement (flight) and process in the relay communication station based on these pieces of information.

The floating movement (flight) and the process in the relay communication station of each of the HAPSs 10 and 20 may be controlled by a management apparatus 85 (also referred to as a "remote control apparatus") as a management apparatus provided in a communication center or the like of the mobile communication network 80. The management apparatus 85 can be configured by, for example, a computer apparatus such as a PC, a server, or the like. In this case, the HAPSs 10 and 20 may incorporate a communication terminal apparatus (for example, mobile communication module) for control so as to be able to receive control information from the management apparatus 85 and transmit various information such as monitoring information to the management apparatus 85, and may be assigned terminal identification information (for example, IP address, telephone number, etc.) so that the HAPSs 10 and 20 can be identified from the management apparatus 85. The MAC address of the communication interface may be used for identification of the communication terminal apparatus for control. Moreover, each of the HAPSs 10 and 20 may transmits information regarding the floating movement (flight) of the own HAPS or a surrounding HAPS and/or the process at the relay communication station, and monitoring information such as information on statuses of the HAPSs 10 and 20 and observation data acquired by various kinds of sensors, to a predetermined destination such as the management apparatus 85. The control information may include target-flight route information on the HAPS. The monitoring information may include at least one of information on current positions, flight-route history information, velocity relative to the air, velocity relative to the ground and propulsion direction of the HAPSs 10 and 20, wind velocity and wind direction around the HAPSs 10 and 20, and atmospheric pressure and temperature around the HAPSs 10 and 20.

In the cell-formation target airspace 40, there is a possibility that a spatial area (spatial area where the three-dimensional cells 41 and 42 are not formed) where the beams 100 and 200 of the HAPSs 10 and 20 do not pass may be occur. In order to complement this spatial area, as shown in the configuration example in FIG. 1, a base station (hereinafter referred to as "ATG station") 30 for forming an ATG (Air To Ground) connection by forming a three-dimensional cell 43 by forming a radial beam 300 from the ground or the sea side upward may be provided.

Further, by adjusting positions of HAPSs 10 and 20 and divergence angles (beam width) of the beams 100 and 200, etc. without using the ATG station 30, the relay communication stations of HAPSs 10 and 20 may form beams 100 and 200 that cover an entirety of an upper end surface of the cell-formation target airspace 40 so that three-dimensional cells are formed all over the cell-formation target airspace 40.

It is noted that, the three-dimensional cell formed by the HAPSs 10 and 20 may be formed so as to reach the ground or the sea surface so that it can communicate with a terminal apparatus located on the ground or on the sea.

Figure 2:
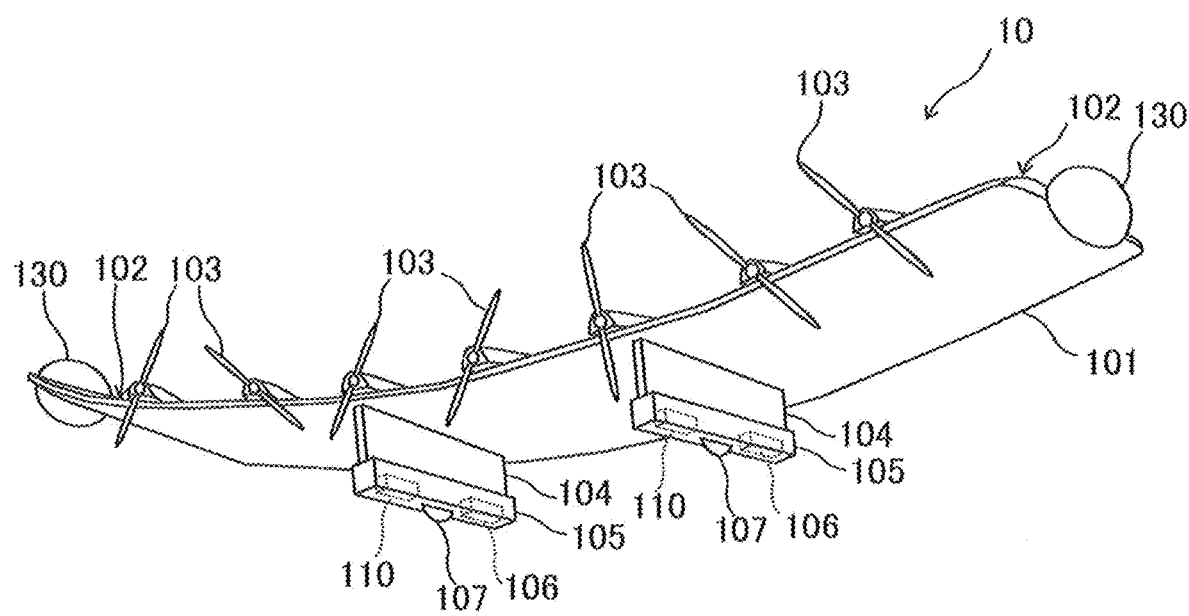
FIG. 2 is a perspective view showing an example of a HAPS used in the communication system in the embodiment.

FIG. 2 is a perspective view showing an example of the HAPS 10 used in a communication system in the embodiment.

The HAPS 10 in FIG. 2 is a solar-plane type HAPS, and has a main wing section 101 with both ends curved upward in the longitudinal direction, and a plurality of motor-driven propellers 103 as propulsion apparatuses of a bus-motive power system provided at one end edge portion of the main wing section 101 in the short direction. A solar power generation panel (hereinafter, referred to as "solar panel") 102 as a solar-photovoltaic power generator section having a solar-photovoltaic power generation function is provided on an upper surface of the main wing section 101. Pods 105 as plural apparatus accommodating sections for accommodating the mission equipment are connected to the two positions in the longitudinal direction of the lower surface of the main wing section 101 via a plate-like connecting section 104. Inside each pod 105, a relay communication station 110 as a mission equipment and a battery 106 are accommodated. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay process by the relay communication station 110 is executed.

The solar-plane type HAPS 10 can float with lift force by, for example, performing a turning flight in a circular shape, performing a flight along a figure of "D", or performing a flight along a figure of "8" based on a predetermined target flight route, and can float to stay in a predetermined range in the horizontal direction at a predetermined altitude. It is noted that, the solar-plane type HAPS 10 can also fly like a glider when the propeller 103 is not rotationally driven. For example, the solar-plane type HAPS 10 can rise to a high position when electric power of the battery 106 is surplus by power generation of the solar panel 102 such as in daytime, and can fly like a glider by stopping the power supply from the battery 106 to the motor when an electric power cannot be generated by the solar panel 102, such as at night.

The HAPS 10 also includes an optical antenna apparatus 130 with a three-dimensionally corresponding directivity as a communication section used for an optical communication with another HAPS or an artificial satellite. It is noted that, although the optical antenna apparatuses 130 are disposed at both ends in the longitudinal direction of the main wing section 101 in the example in FIG. 2, the optical antenna apparatuses 130 may be disposed at other positions of the HAPS 10. It is also noted that, the communication section used for optical communication with the other HAPS or the artificial satellite is not limited to that of performing such optical communication, and the communication may be a radio communication by another method such as radio communication with radio waves such as microwaves.

Figure 3:
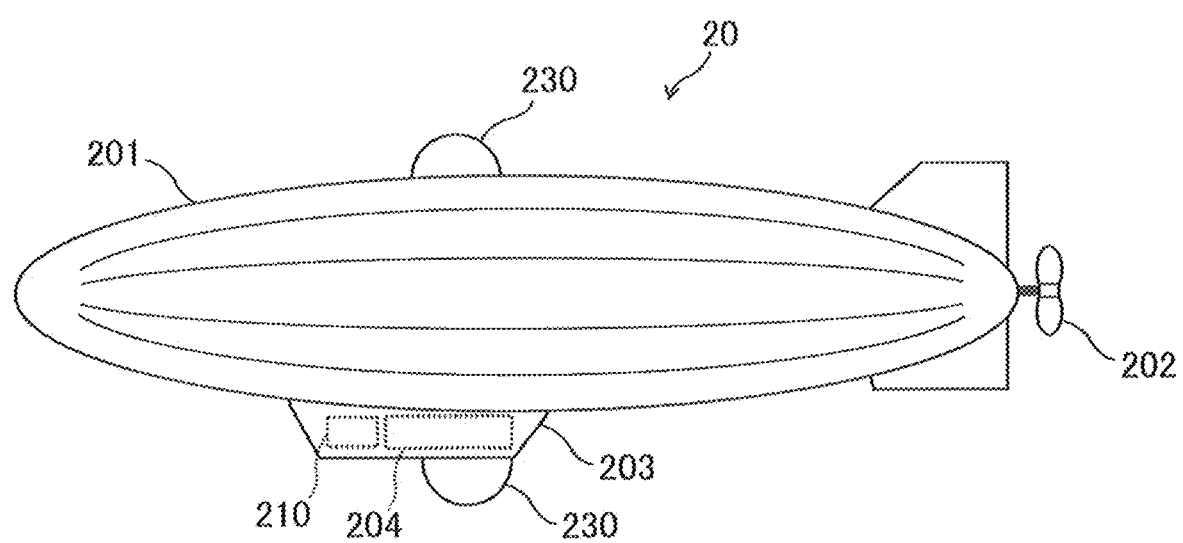
FIG. 3 is a side view showing another example of a HAPS used in the communication system in the embodiment.

FIG. 3 is a perspective view showing another example of the HAPS 20 used in a communication system in the embodiment.

The HAPS 20 in FIG. 3 is an unmanned-airship type HAPS, and can mount a large capacity battery since the payload is large. The HAPS 20 includes an airship body 201 filled with gas such as helium gas for floating by buoyancy, motor-driven propellers 202 as propulsion apparatuses of bus-motive power system, and an equipment accommodating section 203 in which mission equipment is accommodated. A relay communication station 210 and a battery 204 are accommodated in the equipment accommodating section 203. The motor of the propeller 202 is rotationally driven by an electric power supplied from the battery 204, and a radio relay process by the relay communication station 210 is executed.

It is noted that, a solar panel having a photovoltaic power generation function may be provided on the upper surface of the airship body 201, and the electric power generated by the solar panel may be stored in the battery 204.

The unmanned airship type HAPS 20 also includes an optical antenna apparatus 230 with a three-dimensionally corresponding directivity as a communication section used for an optical communication with another HAPS or an artificial satellite. It is noted that, although the optical antenna apparatus 230 is disposed on the upper surface of the airship body 201 and the lower surface of the equipment accommodating section 203 in the example in FIG. 3, the optical antenna apparatus 230 may be disposed on other parts of the HAPS 20. It is also noted that, the communication section used for optical communication with the other HAPS or the artificial satellite is not limited to that of performing such optical communication, and the communication may be a radio communication by another method such as a radio communication with radio waves such as microwaves.

Figure 4:
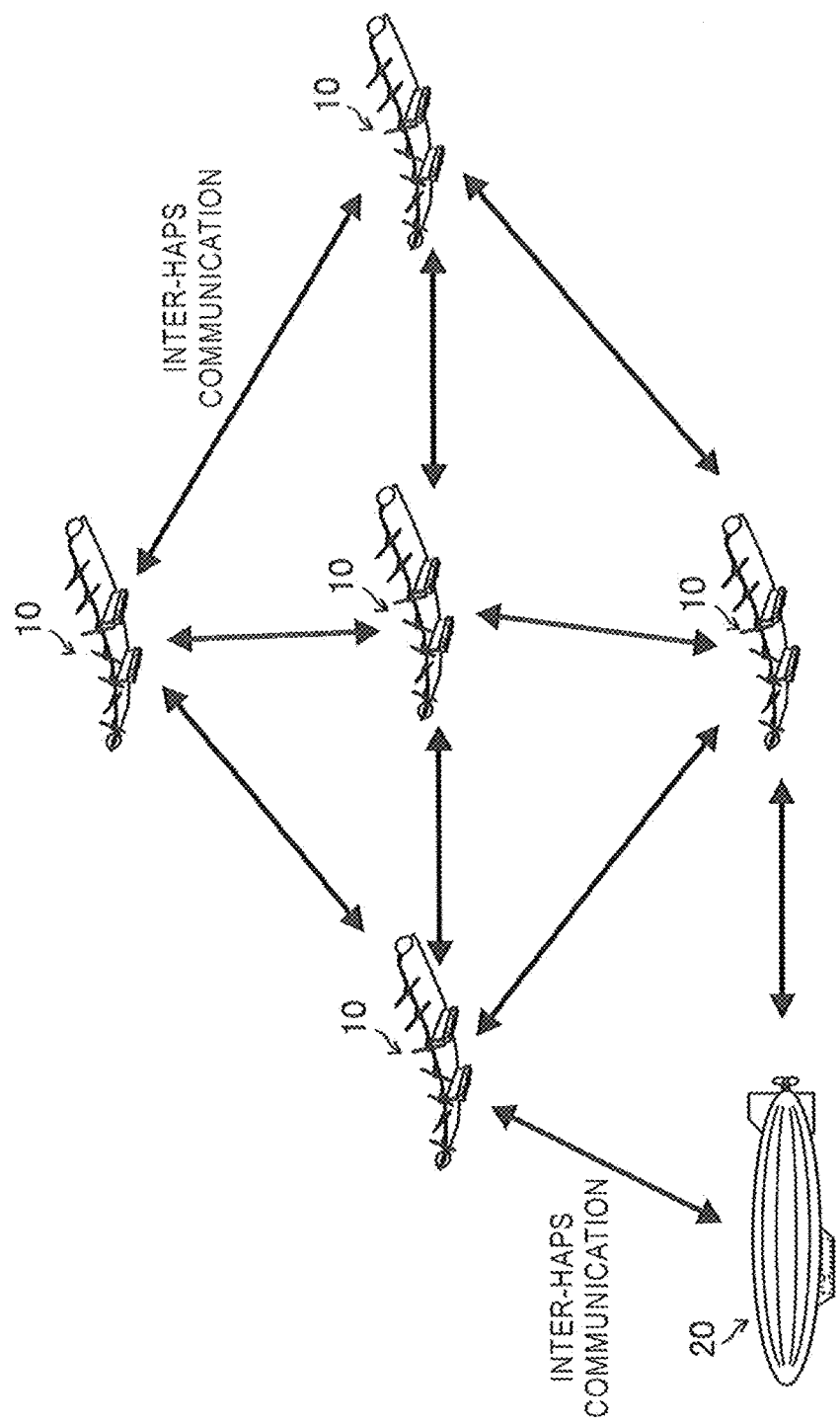
FIG. 4 is an illustration showing an example of a radio network formed in an upper airspace by plural HAPSs in the embodiment.

FIG. 4 is an illustration showing an example of a radio network formed in an upper airspace by plural HAPSs 10 and 20 in the embodiment.

The plural HAPSs 10 and 20 are configured to be capable of performing an inter-HAPS communication with each other by the optical communication in the upper airspace, and form a radio communication network having excellent robustness, which can stably realize a three-dimensional network over a wide area. This radio communication network can also function as an ad hoc network by a dynamic routing according to various environments and various information. The foregoing radio communication network can be formed to have various two-dimensional or three-dimensional topologies, and may be, for example, a mesh-type radio communication network as shown in FIG. 4.

Figure 5:
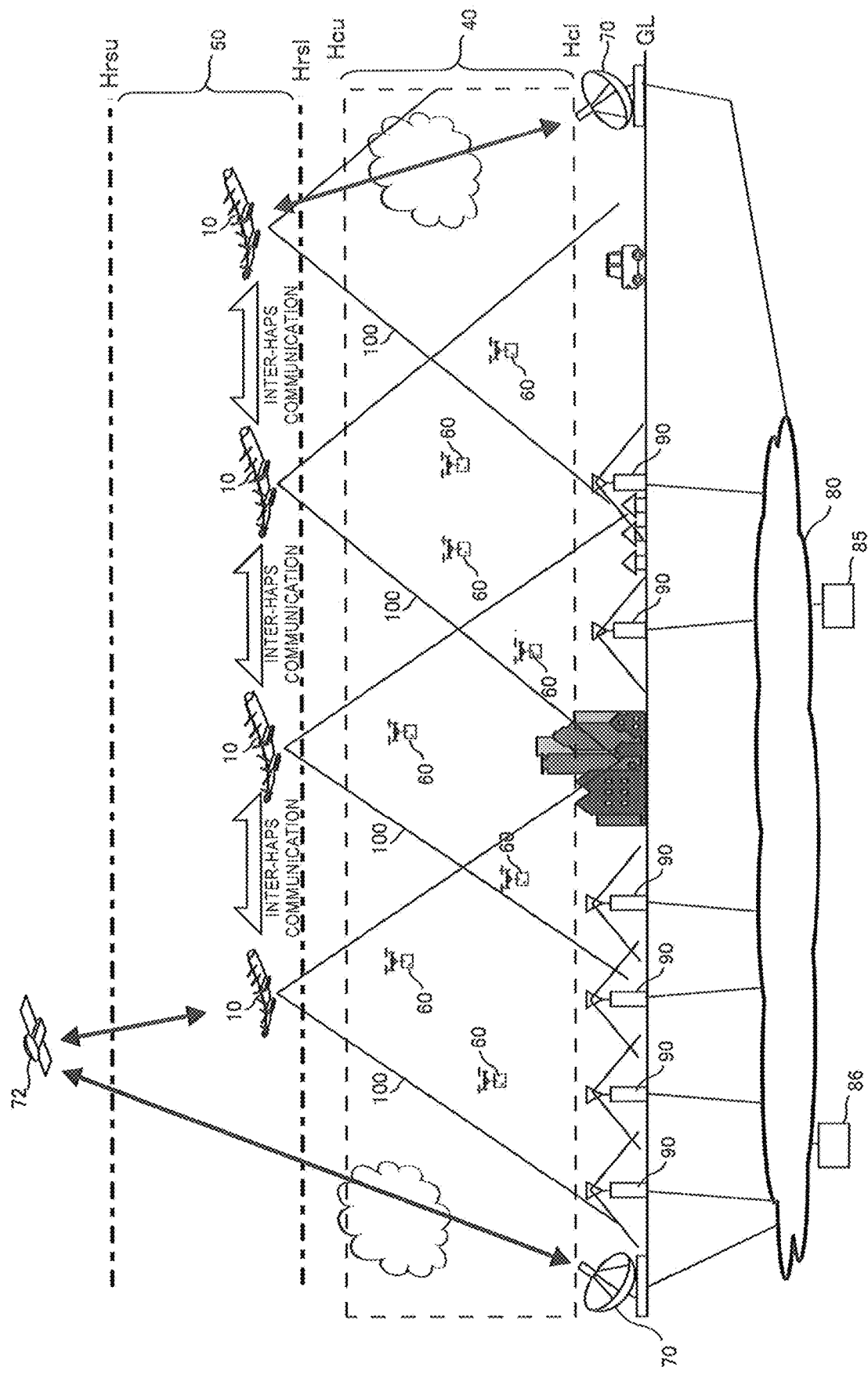
FIG. 5 is a schematic configuration diagram showing an example of an overall configuration of a communication system that realizes a three-dimensional network according to yet another embodiment.

FIG. 5 is a schematic configuration diagram showing an example of an overall configuration of a communication system according to another embodiment.

It is noted that, in FIG. 5, configuration elements similar to those in FIG. 1 described above are denoted by the same reference numerals and explanations thereof are omitted.

In the embodiment of FIG. 5, a communication between the HAPS 10 and the core network of the mobile communication network 80 is performed via the feeder station 70 and a low-orbital artificial satellite 72. In this case, a communication between the artificial satellite 72 and the feeder station 70 may be performed by a radio communication with radio waves such as microwaves, or may be performed by an optical communication using a laser light or the like. A communication between the HAPS 10 and the artificial satellite 72 is performed by an optical communication using a laser light or the like.

Figure 6:
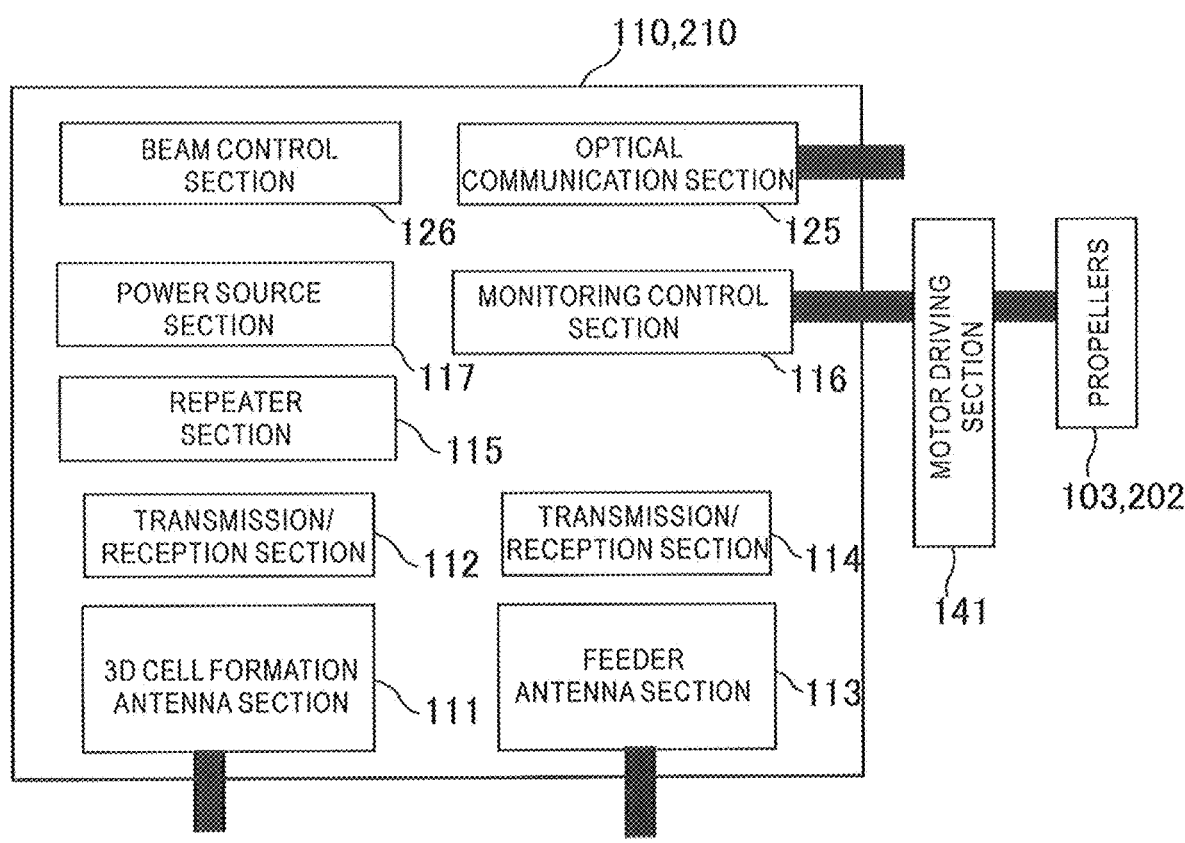
FIG. 6 is a block diagram showing a configuration example of a radio relay station of a HAPS in the embodiment.

FIG. 6 is a block diagram showing a configuration example of the relay communication stations 110 and 210 of the HAPSs 10 and 20 in the embodiment.

The relay communication stations 110 and 210 in FIG. 6 are examples of repeater-type of relay communication stations. Each of the relay communication stations 110 and 210 includes a 3D cell-formation antenna section 111, a transmission/reception section 112, a feeder antenna section 113, a transmission/reception section 114, a repeater section 115, a monitoring control section 116, and a power source section 117. Furthermore, each of the relay communication stations 110 and 210 includes an optical communication section 125 used for the inter-HAPS communication and the like, and a beam control section 126.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 constitutes a first radio communication section together with the 3D cell-formation antenna section 111, has a transmission/reception duplexer (DUP: DUPlexer) and an amplifier, etc., transmits radio signals to the terminal apparatuses located in the three-dimensional cells 41 and 42 and receives radio signals from the terminal apparatuses via the 3D cell-formation antenna section 111.

The feeder antenna section 113 has a directional antenna for performing a radio communication with the feeder station 70 on the ground or on the sea. The transmission/reception section 114 constitutes a second radio communication section together with the feeder antenna section 113, has a transmission/reception duplexer (DUP: DUPlexer) and an amplifier, etc., and transmits/receives radio signals to/from the feeder station 70 via the feeder antenna section 113.

The repeater section 115 relays signals of the transmission/reception section 112 transmitted and received between the terminal apparatus, and signals of the transmission/reception section 114 transmitted and received between the feeder station 70. The repeater section 115 has an amplifier function for amplifying a relay target signal of a predetermined frequency to a predetermined level. The repeater section 115 may have a frequency conversion function for converting a frequency of the relay target signal.

The monitoring control section 116 is configured with, for example, a CPU and a memory, etc., and monitors an operation processing status of each section in the HAPSs 10 and 20 and controls each section, by executing a preinstalled program. In particular, the monitoring control section 116 controls a motor driving section 141 that drives the propellers 103 and 202 to move the HAPSs 10 and 20 to target positions, and controls the HAPSs 10 and 20 to stay in the vicinity of the target positions, by executing a control program.

The power source section 117 supplies the electric power outputted from the batteries 106 and 204 to each section in the HAPSs 10 and 20. The power source section 117 may have a function for storing the electric power generated by the solar power generation panel or the like and an electric power supplied from the outside in the batteries 106 and 204.

The optical communication section 125 communicates with surrounding other HAPSs 10 and 20 or artificial satellite 72 via an optical communication medium such as laser light. This communication enables a dynamic routing that dynamically relays radio communication between the terminal apparatus such as the drone 60 and the mobile communication network 80, and can enhance the robustness of the mobile communication system by backing up and relaying wirelessly with the other HAPSs when one of the HAPSs fails.

The beam control section 126 controls a direction and intensity of a beam of laser light or the like used for the inter-HAPS communication or the communication with the artificial satellite 72, and performs a control so as to switch to another HAPS (relay communication station) that performs a communication by an optical beam such as a laser light according to a change in relative positions with neighboring another HAPS (relay communication station). This control may be performed based on, for example, a position and an attitude of the HAPS itself, a position of the surrounding HAPS and the like. Information on the position and the attitude of the HAPS itself may be acquired based on output of a GPS receiver, a gyro sensor, an acceleration sensor and the like incorporated in the HAPS, and information on the position of the surrounding HAPS may be acquired from the management apparatus 85 provided in the mobile communication network 80, or a server 86 such as HAPS management server and application server.

Figure 7:
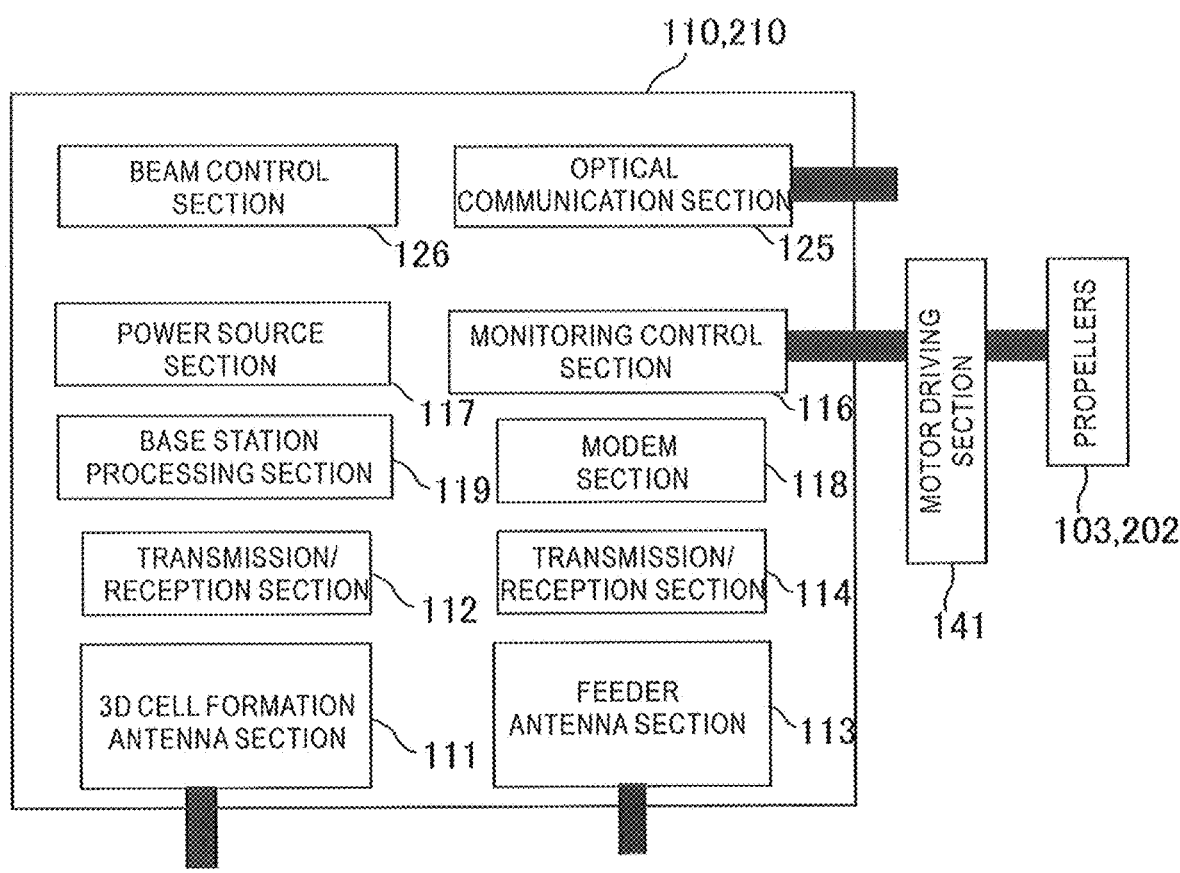
FIG. 7 is a block diagram showing another configuration example of a radio relay station of a HAPS in the embodiment.

FIG. 7 is a block diagram showing another configuration example of the relay communication stations 110 and 210 of the HAPSs 10 and 20 in the embodiment.

The relay communication stations 110 and 210 in FIG. 7 are examples of base-station type of relay communication stations.

It is noted that, in FIG. 7, configuration elements similar to those in FIG. 6 are denoted by the same reference numerals and explanations thereof are omitted. Each of the relay communication stations 110 and 210 in FIG. 7 further includes a modem section 118, and includes a base-station processing section 119 instead of the repeater section 115. Further, each of the relay communication stations 110 and 210 includes the optical communication section 125 and the beam control section 126.

The modem section 118, for example, performs a demodulation processing and a decoding processing for a reception signal received from the feeder station 70 via the feeder antenna section 113 and the transmission/reception section 114, and generates a data signal to be outputted to the base-station processing section 119 side. The modem section 118 performs an encoding processing and a modulation processing for the data signal received from the base-station processing section 119 side, and generates a transmission signal to be transmitted to the feeder station 70 via the feeder antenna section 113 and the transmission/reception section 114.

The base-station processing section 119 has, for example, a function as an e-NodeB that performs baseband processing based on a method conforming to the standard of LTE/LTE-Advanced. The base-station processing section 119 may process in a method conforming to a future standard of mobile communication such as the fifth generation.

The base-station processing section 119, for example, performs a demodulating process and a decoding process for a reception signal received from a terminal apparatus located in the three-dimensional cells 41 and 42 via the 3D cell-formation antenna section 111 and the transmission/reception section 112, and generates a data signal to be outputted to the modem section 118 side. The base-station processing section 119 performs an encoding process and a modulating process for the data signal received from the modem section 118 side, and generates a transmission signal to be transmitted to the terminal apparatus in the three-dimensional cells 41 and 42 via the 3D cell-formation antenna section 111 and the transmission/reception section 112.

Figure 8:
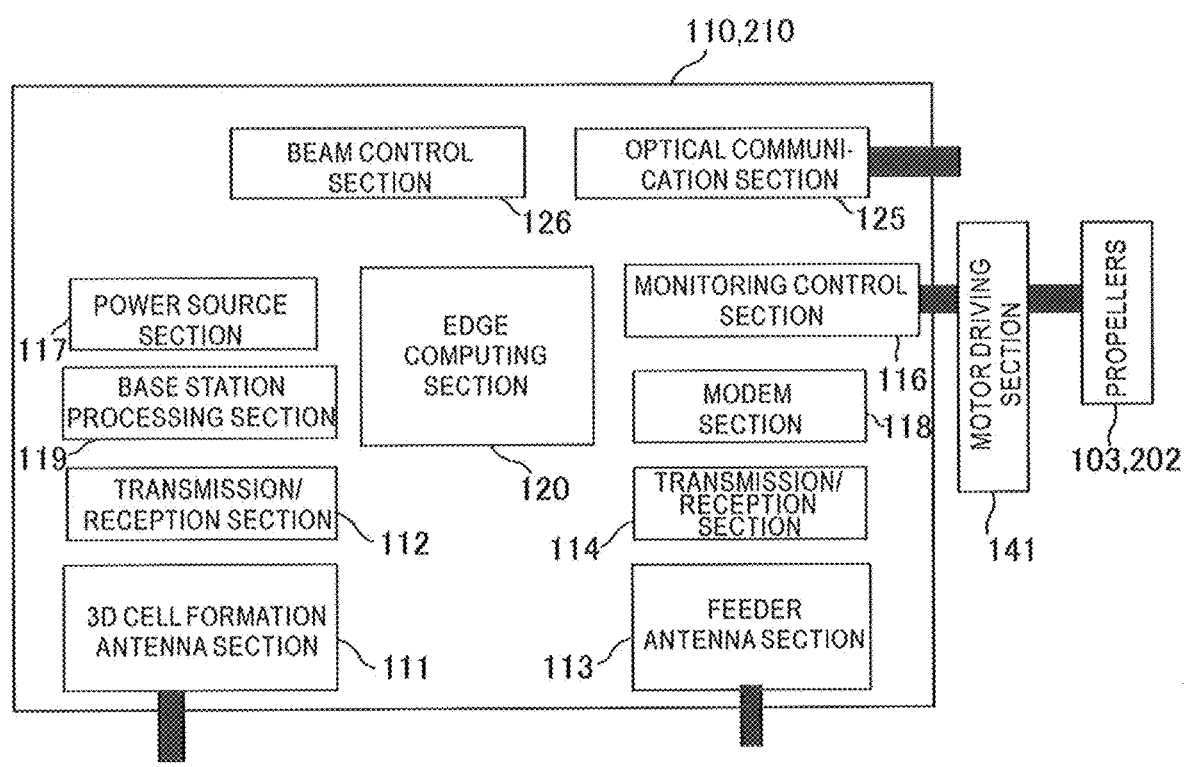
FIG. 8 is a block diagram showing yet another configuration example of a radio relay station of a HAPS in the embodiment.

FIG. 8 is a block diagram showing yet another configuration example of the relay communication stations 110 and 210 of the HAPSs 10 and 20 in the embodiment.

The relay communication stations 110 and 210 in FIG. 8 are examples of high-performance base-station type of relay communication stations having an edge computing function. It is noted that, in FIG. 8, configuration elements similar to those in FIG. 6 and FIG. 7 are denoted by the same reference numerals and explanations thereof are omitted. Each of the relay communication stations 110 and 210 in FIG. 8 further includes an edge computing section 120 in addition to the configuration elements in FIG. 7.

The edge computing section 120 is configured with, for example, a compact computer, and can perform various types of information processing relating to a radio relay, and the like in the relay communication stations 110 and 210 of the HAPSs 10 and 20, by executing the preinstalled program.

For example, the edge computing section 120 determines a transmission destination of a data signal based on a data signal received from a terminal apparatus located in the three-dimensional cells 41 and 42, and performs a process of switching a relay destination of communication based on the determination result. More specifically, in case that a transmission destination of the data signal outputted from the base-station processing section 119 is a terminal apparatus located in the own three-dimensional cells 41 and 42, instead of passing the data signal to the modem section 118, the edge computing section 120 returns the data signal to the base-station processing section 119 so that the data signal is transmitted to a terminal apparatus of the transmission destination located in its own three-dimensional cells 41 and 42. On the other hand, in case that the transmission destination of the data signal outputted from the base-station processing section 119 is a terminal apparatus located in a cell other than the own three-dimensional cells 41 and 42, the edge computing section 120 passes the data signal to the modem section 118 to transmit to the feeder station 70 so that the data signal is transmitted to a terminal apparatus of the transmission destination located in the other cell of the transmission destination via the mobile communication network 80.

The edge computing section 120 may perform a process of analyzing information received from a large number of terminal apparatuses located in the three-dimensional cells 41 and 42. This analysis result may be transmitted to the management apparatus 85 provided in the mobile communication network 80, or the server 86 such as HAPS management server or application server (App server) as a management apparatus.

Duplex methods of uplink and downlink for radio communication with a terminal apparatus via the relay communication stations 110 and 210 are not limited to specific methods, and may be, for example, a time division duplex method (Time Division Duplex: TDD) or a frequency division duplex method (Frequency Division Duplex: FDD). An access method for radio communication with a terminal apparatus via the relay communication stations 110 and 210 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus at the same time/same frequency, and may be an MU-MIMO (Multi-User MIMO) technology in which one base station transmits signals to plural different communication terminal apparatuses at the same time/same frequency or plural different base stations transmit signals to one terminal apparatus at the same time/same frequency.

It is noted that, in the following embodiments, although a case in which a communication relay apparatus that wirelessly communicates with the terminal apparatus 61 is either the solar-plane type HAPS 10 or the unmanned airship type HAPS 20 is illustrated and described, the communication relay apparatus may be either HAPS 10 or HAPS 20. Further, the following embodiments can be similarly applied to other aerial-floating type communication relay apparatuses other than the HAPSs 10 and 20.

A link between the HAPSs 10 and 20 and a base station 90 via a gateway station (hereinafter abbreviated as "GW station") 70 as a feeder station is referred to as a "feeder link", and a link between the HAPS 10 and the terminal apparatus 61 is referred to as a "service link". In particular, an interval between the HAPSs 10 and 20 and the GW station 70 is referred to as a "radio interval of feeder link". Further, a downlink of a communication from the GW station 70 to the terminal apparatus 61 via the HAPSs 10 and 20 is referred to as a "forward link", and an uplink of a communication from the terminal apparatus 61 to the GW station 70 via the HAPSs 10 and 20 is also referred to as a "reverse link".

Figure 9:
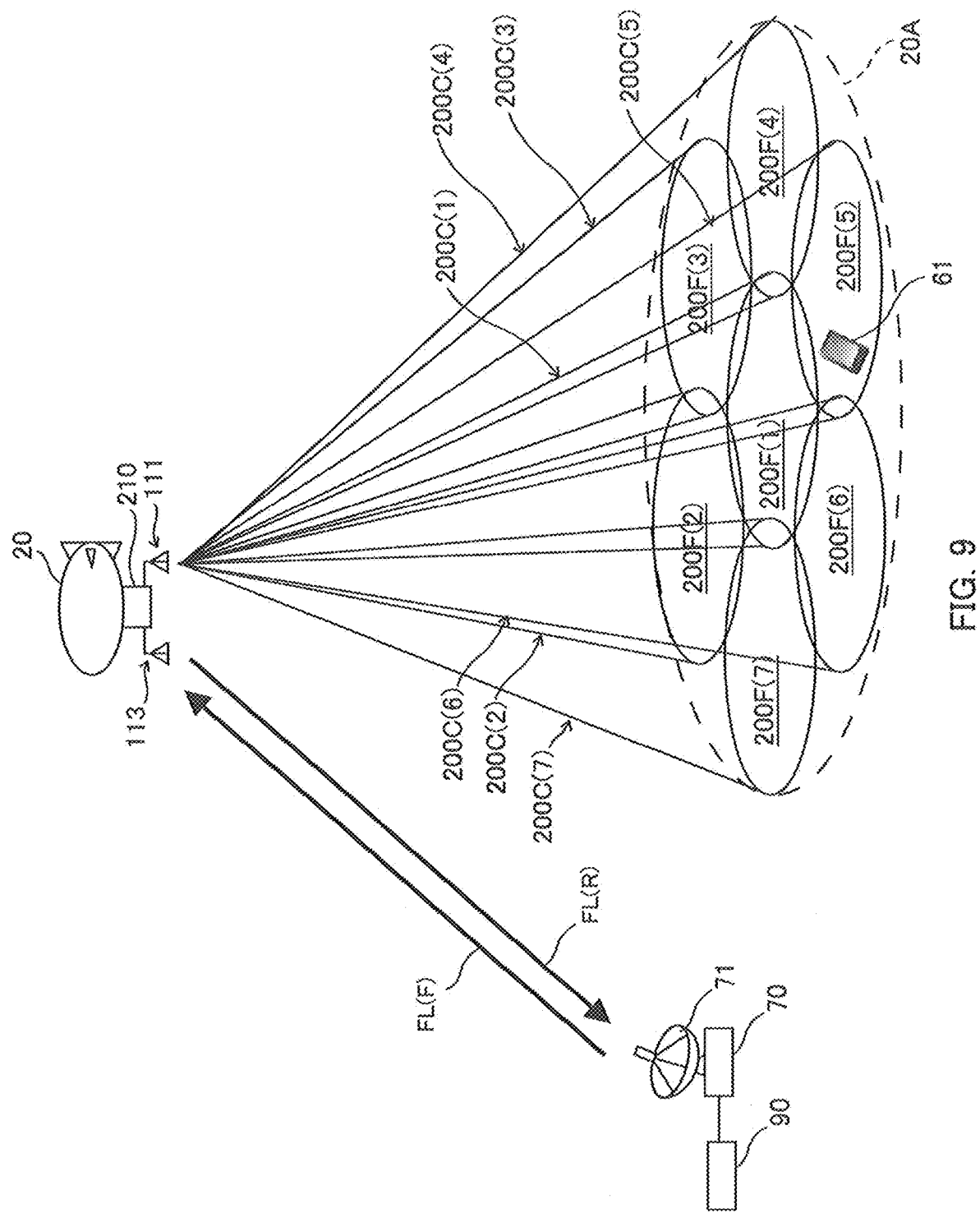
FIG. 9 is an illustration showing an example of a cell configuration of a HAPS according to the embodiment.

FIG. 9 is an illustration showing an example of a cell configuration of the HAPS 20 according to the embodiment. In FIG. 9, although the communication relay apparatus is the unmanned-airship type HAPS 20, may be the solar-plane type HAPS 10. Further, in the illustrated example, although the HAPS 20 is located in the stratosphere with an altitude of about 20 km, the HAPS 20 forms plural cells 200C(1) to 200C(7), and a diameter of a service area 20A consisting of footprints 200F(1) to 200F(7) of the cells 200C(1) to 200C(7) of the plural cells (7 cells) configuration is 100 to 200 km, it is not limited to these.

In FIG. 9, a communication service that directly communicates with the terminal apparatus 61 on the ground (or on the water) using the HAPS 20 located in the stratosphere is very attractive as an expansion of service area and a communication means at the time of a disaster. The communication line of the HAPS 20 consists of a feeder link FL connecting the GW station 70 and the HAPS 20, and a service link SL connecting the HAPS 20 and the terminal apparatus 61. Since the communication capacity of the service link is determined by the communication capacity of the feeder link which is the relay frequency, it is necessary to improve the frequency utilization efficiency of the feeder link. In particular, in case that the service link has a multi-cell configuration as shown in FIG. 9, the communication capacity of the feeder link tends to be insufficient, so that the frequency effective utilization technology of the feeder link is indispensable. However, in case that the HAPS 20 and the GW station 70 are configured one-to-one, it is difficult to improve the frequency utilization efficiency of the feeder link.

Therefore, in the present embodiment, plural GW stations that transmit and receive different relay signals from each other at a same frequency in the feeder link with the HAPS 20 are provided, and plural gateway systems (hereinafter also referred to as "plural GW systems") that perform spatial-division multiplex communication between one HAPS 20 and plural GW stations are constructed. In the plural GW systems, by eliminating interference between the plural feeder links, the frequency utilization efficiency can be improved by the number of GW stations to be installed.

It is noted that, in the following embodiments, although a case in which the spatial-division multiplex communication between the HAPS 20 and the plural GW stations is performed only by a forward link of the feeder link will be described, the spatial-division multiplex communication may be performed only by a reverse link of the feeder link, or may be performed by both the forward link and the reverse link.

Figure 10B:
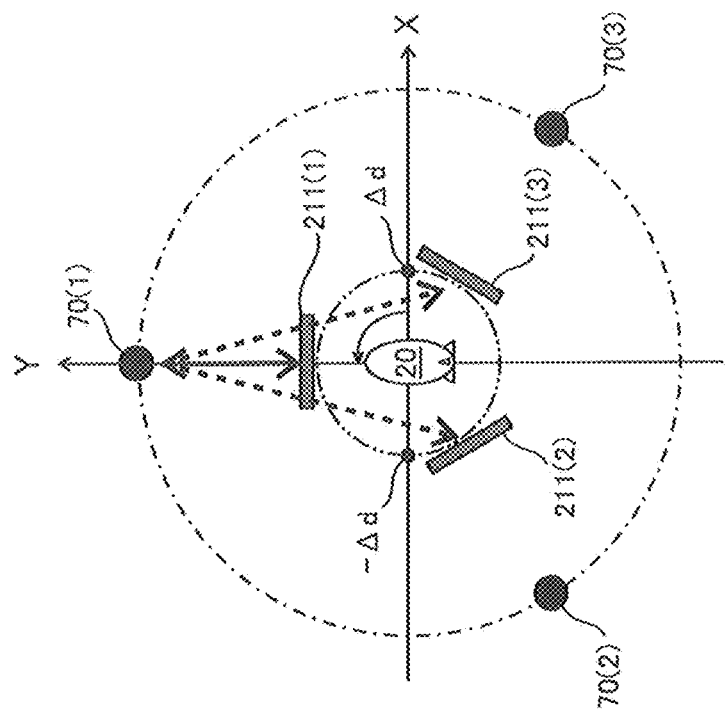
FIG. 10B is a top view illustration of a relationship between plural antennas for feeder link of a HAPS and plural GW stations.
Figure 10A:
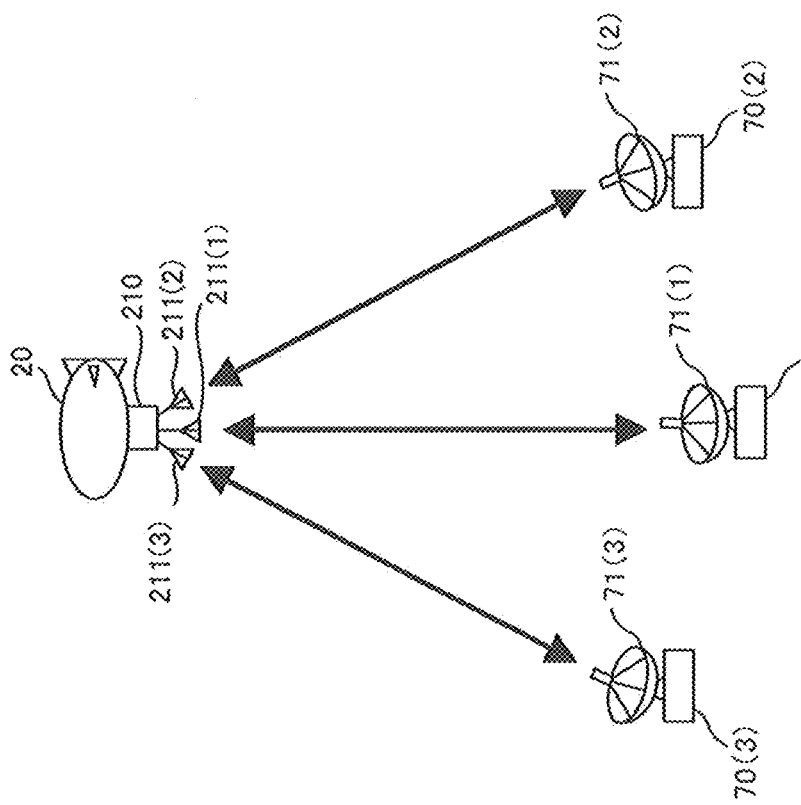
FIG. 10A is a side view showing an example of a schematic configuration of plural GW systems according to the embodiment.

FIG. 10A is a side view showing an example of a schematic configuration of plural GW systems according to the embodiment, and FIG. 10B is a top view illustration of a relationship between plural antennas for feeder link (hereinafter referred to as "FL antennas") 211(1) to 211(3) of the HAPS 20 and plural GW stations 70(1) to 70(3). In the illustrated example, each of the number of FL antennas (N) and the number of GW stations (N) is the same number (3 in the illustrated example), and the same number of FL antennas 211(1) to 211(3) and GW stations 70(1) to 70(3) are provided in a one-to-one correspondence with each other. The number of sets of the FL antenna 211 and the GW station 70 may be two sets or four or more sets. Further, in the illustrated example, although the plural GW stations 70 are disposed so that distances from the HAPS 20 and intervals between the GW stations are equal to each other, at least one of the distances and the intervals may be different from each other. Each GW station 70 is disposed so that complex amplitudes received by each FL antenna 211 (also referred to as "HAPS station antenna") of the HAPS 20 are uncorrelated. Further, the antennas for feeder link (hereinafter referred to as "GW antennas") 71(1) to 71(3) of the GW stations 70(1) to 70(3) can transmit and receive with two polarized waves of vertically polarized waves (V) and horizontally polarized waves (H) orthogonal to each other. In the illustrated example, although the plural FL antennas 211(1) to 211(3) of the HAPS 20 are disposed so that distances from the center of the HAPS 20 and intervals between the FL antennas are equal to each other, at least one of the distances and the intervals may be different from each other between the FL antennas. For example, the distances and the intervals may be different from each other between the FL antennas.

Figure 11:
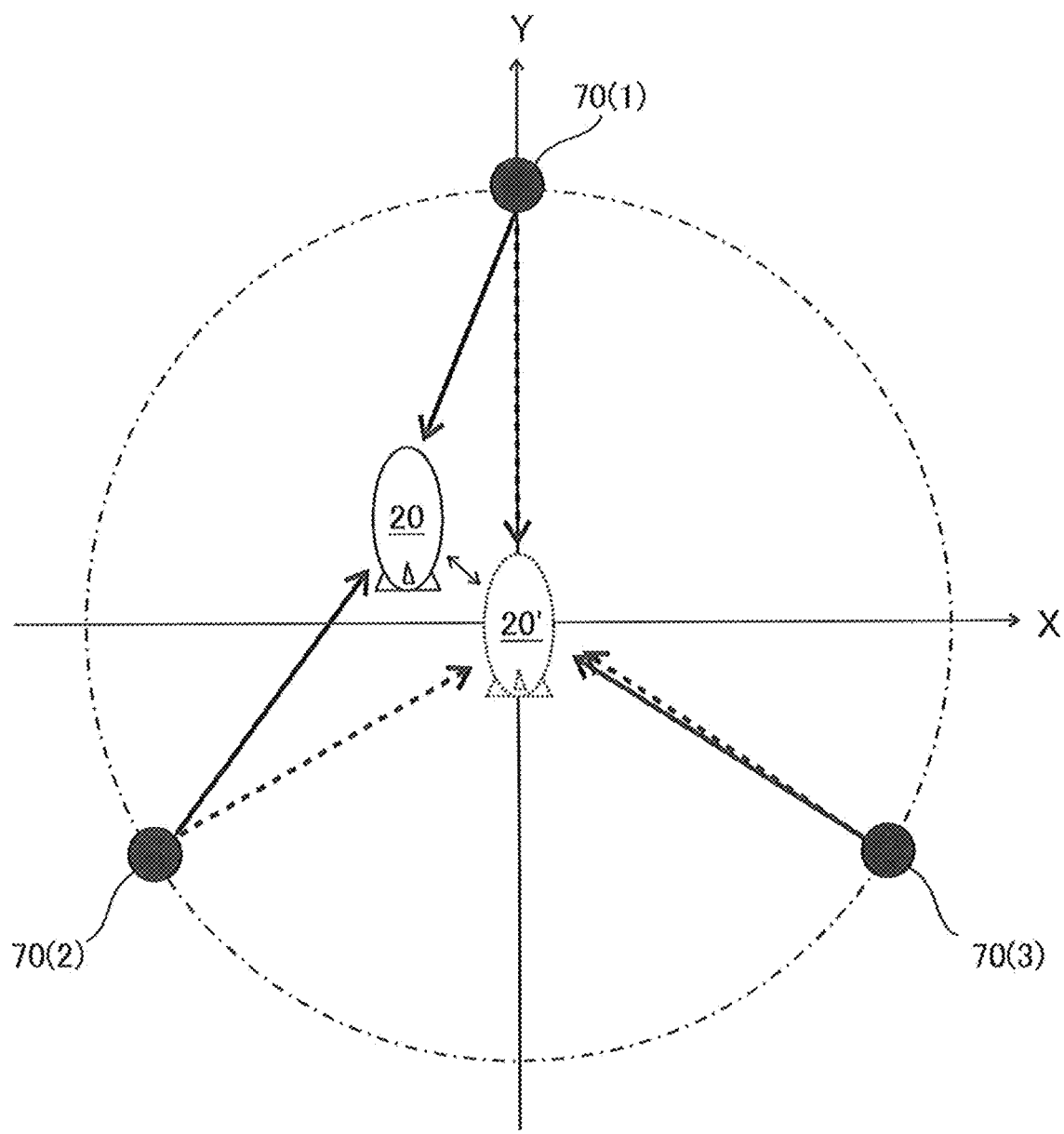
FIG. 11 is an illustration showing an example of state that GW antennas of plural GW stations track HAPS according to the embodiment.

As shown in FIG. 11, each of the plural GW stations 70(1) to 70(3) may include an antenna control section that controls the GW antennas 71(1) to 71(3) so as to track the HAPS 20 moving in an airspace. A dashed line HAPS 20' in the figure indicates a position before the movement, and a solid line HAPS 20 in the figure indicates a position after the movement. By tracking the HAPS 20 by each of the GW antennas 71(1) to 71(3), even when using the GW antennas 71(1) to 71(3) with high directivity such as a parabolic antenna, the deterioration of the communication quality of the feeder link due to the movement of the HAPS 20 can be suppressed.

Figure 12:
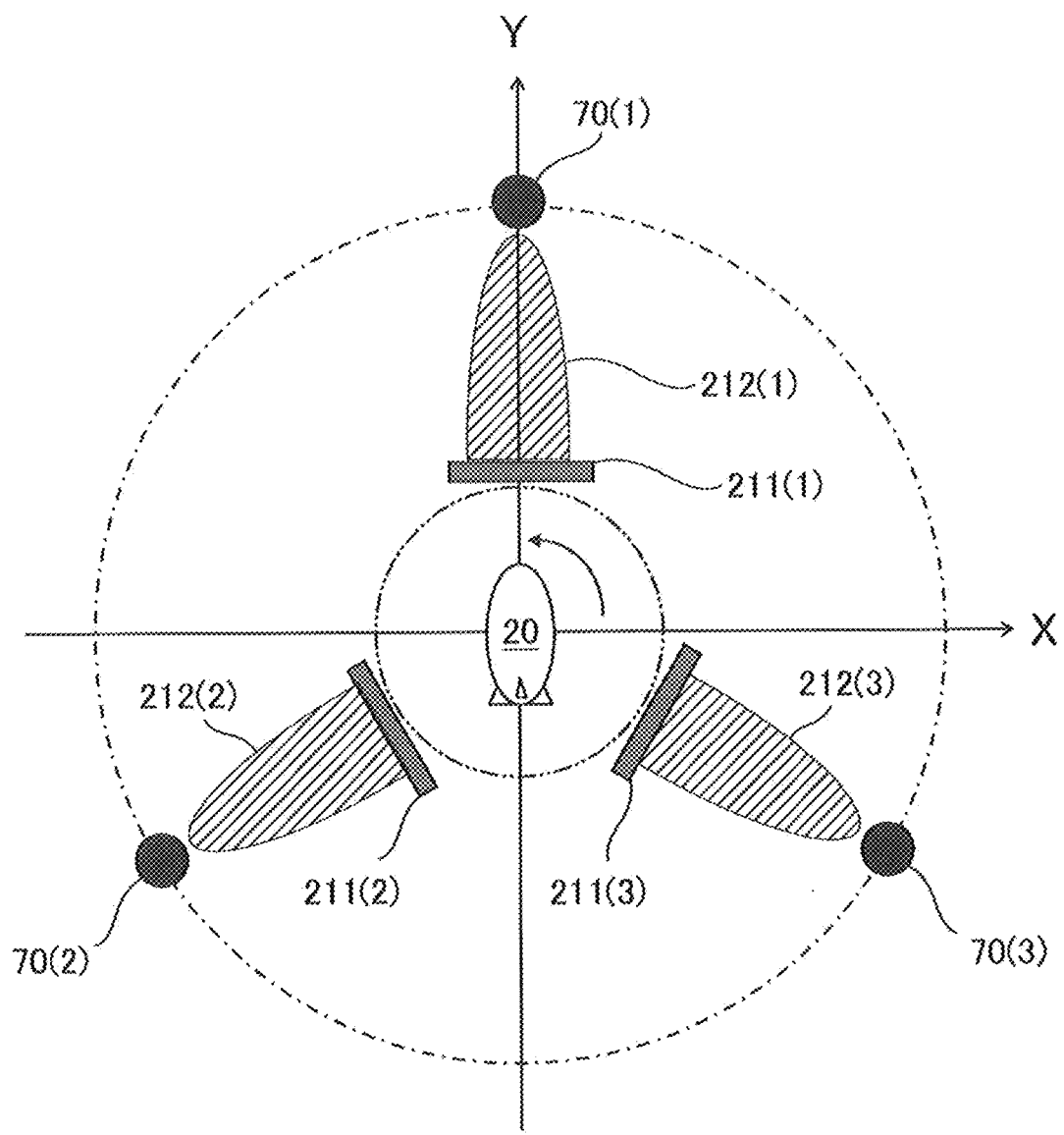
FIG. 12 is an illustration showing an example of directional beams of plural FL antennas of a HAPS according to the embodiment.

As shown in FIG. 12, each of the plural FL antennas 211(1) to 211(3) of the HAPS 20 may include antenna directional beams (hereinafter referred to as "directional beam" or "beam") 212(1) to 212(3) corresponding to the GW stations 70(1) to 70(3), and the HAPS 20 may include an antenna control section that controls the FL antennas 211(1) to 211(3) so that each of the directional beams 212(1) to 212(3) of the plural FL antennas 211(1) to 211(3) is directed in the direction of the corresponding GW stations 70(1) to 70(3). Each of the directional beams 212(1) to 212(3) of the FL antennas 211(1) to 211(3) is formed, for example, so as to face the direction of the GW station 70 closest to itself and not to interfere with other GW stations, that is, so that a ratio (F/B) of a gain of the main beam and a gain in the opposite direction becomes sufficiently large. As a result, even when the HAPS 20 moves or rotates, it is possible to suppress deterioration of the communication quality of the feeder link due to the movement and rotation of the HAPS 20.

As a control system of the directional beams 212(1) to 212(3) of the plural FL antennas 211(1) to 211(3) by the antenna control section of the HAPS 20, various systems such as a gimbal system, an electric system (360-degrees beamforming control system), and an electric system (beamforming control system with limited angles+antenna switching) can be used.

Figure 13:
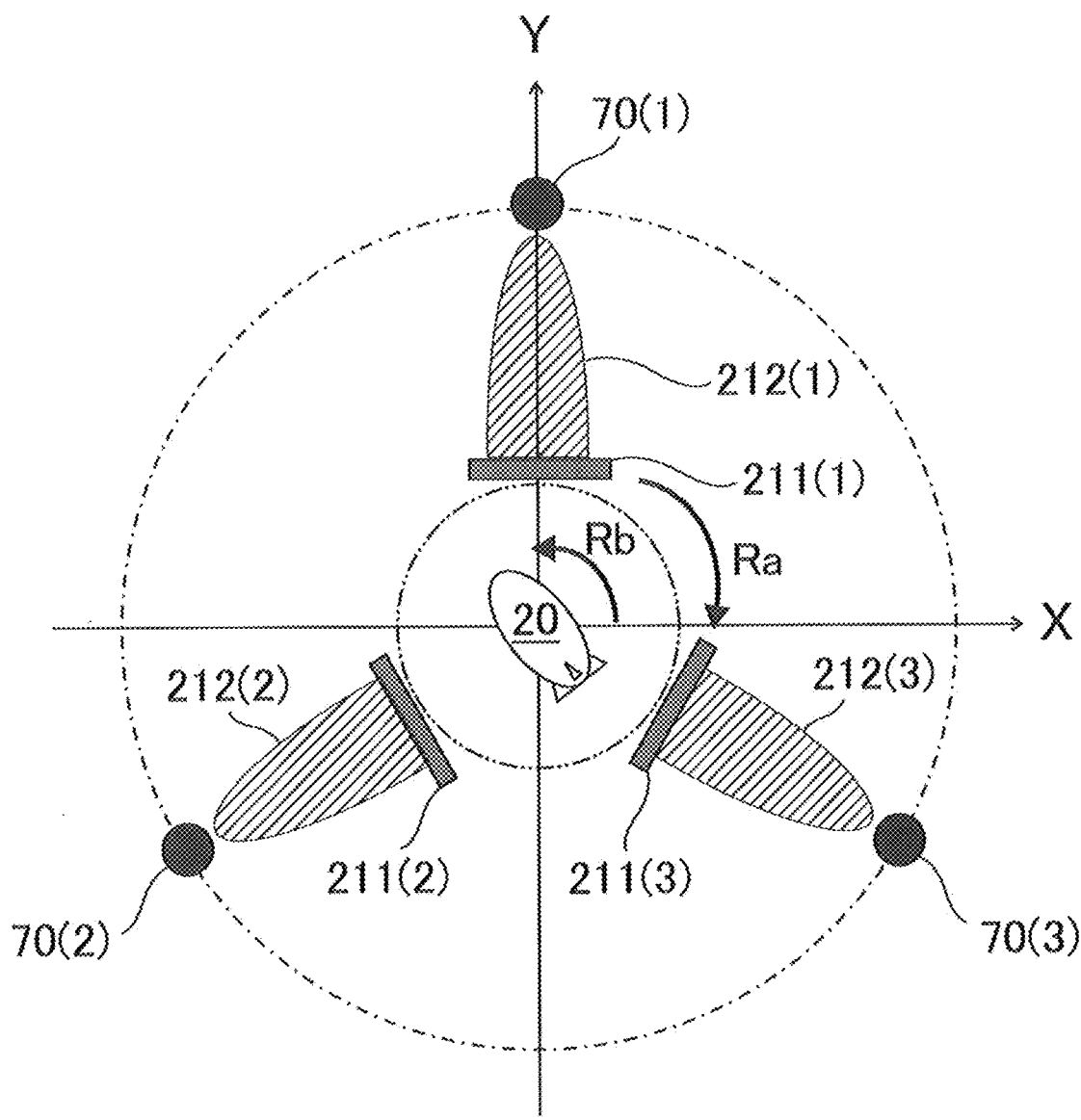
FIG. 13 is an illustration showing an example of directional beam control of a FL antenna in a HAPS according to the embodiment.

For example, in the gimbal system in FIG. 13, the entirety of plural FL antennas 211(1) to 211(3) can be mechanically rotationally driven and controlled around the axis in accordance with the rotation (turning) around the vertical axis (yawing axis, Z axis) of the HAPS 20. For example, in FIG. 13, when the HAPS 20 rotates about 45 degrees in a counterclockwise direction Rb, the entirety of plural FL antennas 211(1) to 211(3) are mechanically rotationally driven in a clockwise direction Ra opposite to the direction of rotation.

Although the rotational drive control for angle adjustment of each FL antenna 211(1) to 211(3) may be performed with reference to information on a position and an orientation of the HAPS, the rotational drive control of each FL antenna 211(1) to 211(3) may be performed with reference to reception level values of the FL antennas 211(1) to 211(3). For example, each FL antenna 211(1) to 211(3) is rotated in small steps, an angle that maximizes the reception level of each FL antenna 211(1) to 211(3) is found, and the rotational drive control of each FL antenna 211(1) to 211(3) is performed so as to face the angle. Herein, a threshold value may be set for each of the reception level of each FL antenna 211(1) to 211(3), each FL antenna 211(1) to 211(3) may be rotated by a predetermined angle when it falls below that value, and the rotational drive control of the FL antenna 211(1) to 211(3) may be performed to the angle at which the reception level is maximized. The threshold value of the reception level may be obtained, for example, by an experiment in advance, and the predetermined angle may be, for example, the value of 360 degrees divided by the number of FL antennas (120 degrees in the illustrated example). Further, a monitoring beam from each of the FL antenna 211(1) to 211(3) may be generated for comparing the reception levels from the GW stations other than the corresponding GW station, a GW station having the maximum level may be selected, and each FL antenna 211(1) to 211(3) may be rotationally driven and controlled so that the directional beam is directed in that direction.

It is noted that, although the angle adjustment in the horizontal direction of each FL antenna 211(1) to 211(3) is shown in FIG. 13, the angle adjustment in the vertical direction may be also performed in the same manner.

By the rotational drive control of the FL antennas 211(1) to 211(3), even if the HAPS 20 rotates, since the directional beams 212(1) to 212(3) of the FL antennas 211(1) to 211(3) are directed in the corresponding directions of the GW stations 70(1) to 70(3) respectively, the deterioration of the communication quality of the feeder link can be prevented.

Figure 14:
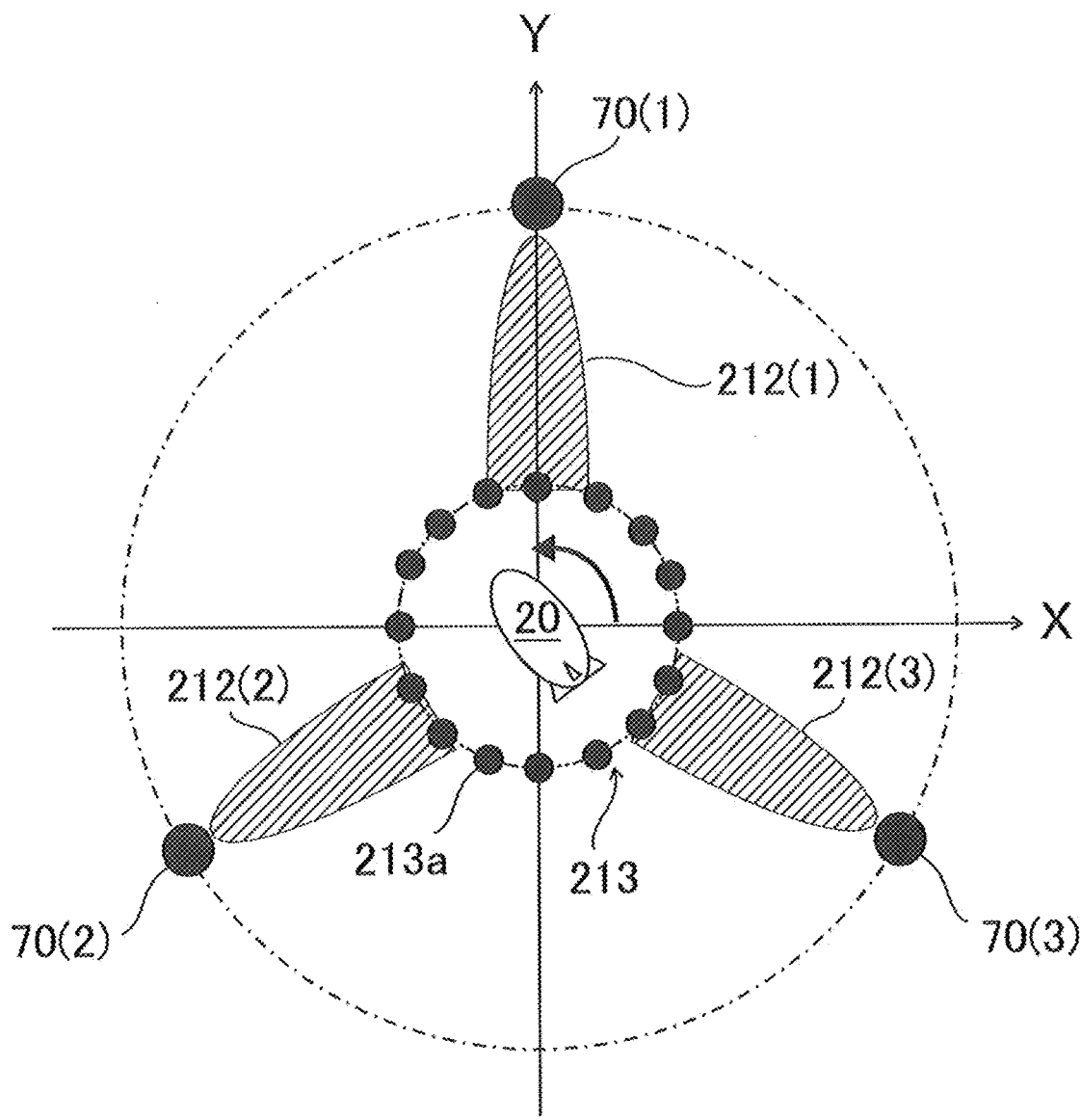
FIG. 14 is an illustration showing another example of directional beam control of a FL antenna in a HAPS according to the embodiment.

Further, in the electric system (360-degrees beamforming control system) in FIG. 14, a circular array antenna 213 in which plural antenna elements 213a are disposed along the circumferential shape is provided as a FL antenna. Then, based on information on a position and an attitude of the HAPS 20, a weight applied to signals (amplitude, phase) transmitted and received via each of the plural antenna elements 213a is controlled. For example, information on the position and the attitude of the HAPS 20 may be acquired based on an output of a GNSS Inertial Navigation System (GNSS/INS) which is combining a GNSS (Global Navigation Satellite System) system and an Inertial Measurement Unit (IMU) incorporated in the HAPS 20.

Although the weight control of each antenna element 213a of the circular array antenna 213 may be performed with reference to the information on the position and the attitude of the HAPS, the weight control of each antenna element 213a may be performed so as to form a directional beam having the maximum reception level at a position corresponding to each GW station with reference to the reception level value of each antenna element 213a of the circular array antenna 213. For example, a phase of each antenna element 213a of the circular array antenna 213 is changed in small steps, an angle that maximizes the reception level is found, and the weight control of each antenna element 213a is performed so that a beam is formed in that angle direction. Further, a monitoring beam for comparing the reception level from other than the corresponding GW station from the circular array antenna 213 may be created, a GW station having the maximum level may be selected, and a beam may be formed in that direction.

It is noted that, although the beam angle adjustment in the horizontal direction is shown in FIG. 14, the beam angle adjustment may be also performed in the same manner in the vertical direction.

By controlling the weight of each antenna element 213a of the circular array antenna 213, the directional beams 212(1) to 212(3) directed in each direction of the plural GW stations 70(1) to 70(3) are formed. As a result, even if the HAPS 20 rotates, since the directional beams 212(1) to 212(3) of the FL antennas 211(1) to 211(3) are directed in the corresponding directions of the GW stations 70(1) to 70(3) respectively, the deterioration of the communication quality of the feeder link can be prevented.

Figure 15:
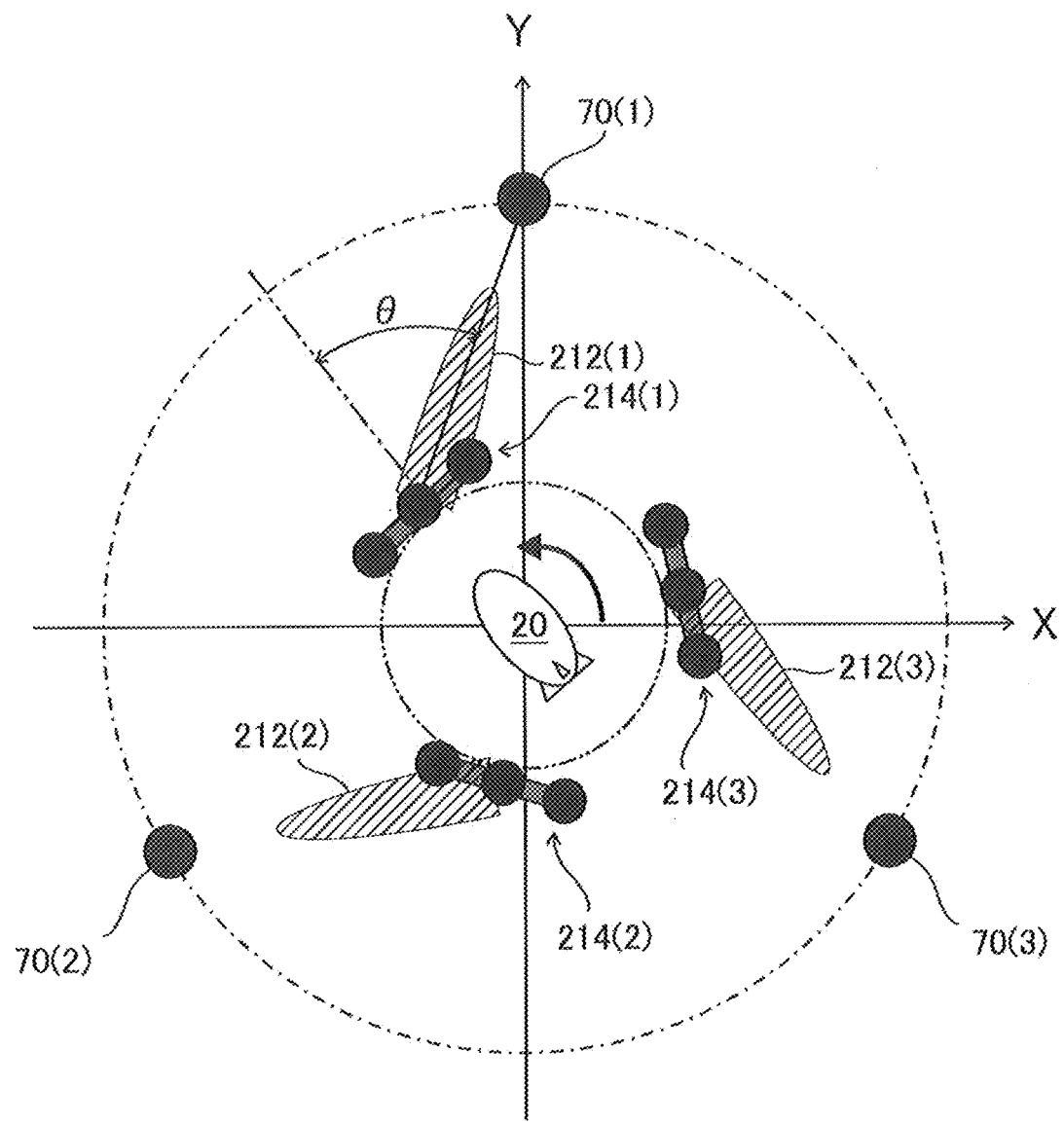
FIG. 15 is an illustration showing yet another example of directional beam control of a FL antenna in a HAPS according to the embodiment.

In the electric system (beamforming control system with limited angles+antenna switching) of FIG. 15, plural planar array antennas 214(1) to 214(3) in which plural antenna elements 214a are two-dimensionally disposed in a plane are provided as a FL antenna. Then, based on information on the position and the attitude of the HAPS 20 acquired by GNS SANS etc., a beamforming control is performed to control a weight applied to signals (amplitude, phase) transmitted and received via each of the plural antenna elements 214a of the plural planar array antennas 214(1) to 214(3).

Although the switching of the planar array antennas 214(1) to 214(3) and the beamforming control may be performed with reference to the information on the position and the attitude of the HAPS, the antenna switching and beamforming may be controlled so that each of the planar array antennas 214(1) to 214(3) has the maximum reception level with reference to the reception level value of each planar array antenna 214(1) to 214(3). For example, each planar array antenna 214 (1) to 214 (3) is rotated in small steps, an angle that maximizes the reception level of each planar array antenna 214(1) to 214(3) is found, and the rotational drive control of each planar array antenna is performed so as to face that angle. Herein, a threshold value may be set for each of the reception level of each planar array antenna 214(1) to 214(3), when it falls below that value, the planar array antennas 214(1) to 214(3) may be switched and each planar array antenna 214(1) to 214(3) may be rotated by a predetermined angle, and a beamforming may be performed to form a beam at an angle that maximizes the reception level. The threshold value of the reception level may be obtained, for example, by an experiment in advance, and the predetermined angle may be, for example, 360 degrees/number of FL antennas (120 degrees in the illustrated example). Further, a monitoring beam for comparing the reception level from other than the corresponding GW station from each planar array antenna 214(1) to 214(3) may be generated, a GW station that each planar array antenna 214(1) to 214(3) has the maximum level may be selected, and an antenna switching and a beamforming may be performed so as to form a beam in that direction.

It is noted that, although the beam angle adjustment in the horizontal direction is shown in FIG. 15, the beam angle adjustment may be also performed in the same manner in the vertical direction.

By the switching of the planar array antennas 214(1) to 214(3) and the beamforming control, the directional beams 212(1) to 212(3) directed in each direction of the plural GW stations 70(1) to 70(3) are formed. Herein, for example, when the angle (θ in the figure) at which the directional beam 212(1) is tilted with respect to the normal direction perpendicular to the plane of the planar array antenna 214(1) becomes larger than the preset predetermined angle θth degrees, the FL antenna corresponding to the GW station 70(1) is switched to the planar array antenna 214(2). As a result, even if the HAPS 20 rotates, each of the directional beams 212(1) to 212(3) of the FL antennas 211(1) to 211(3) faces the corresponding GW stations 70(1) to 70(3), so that deterioration of the communication quality of the feeder link can be prevented.

Figure 16:
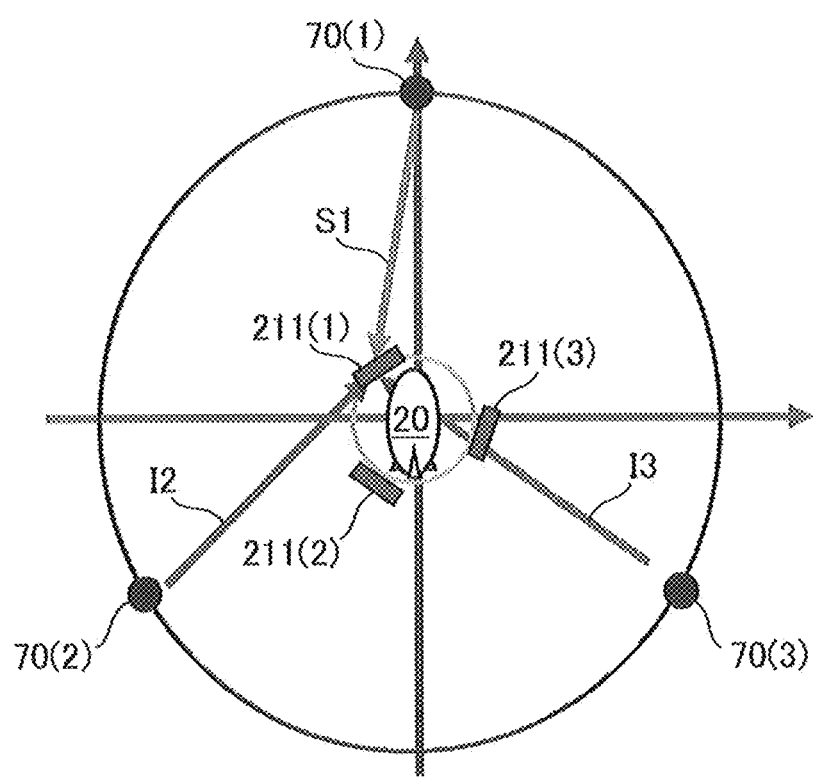
FIG. 16 is an illustration of an example of interference between GW stations (between feeder links) in plural GW systems.

In the plural GW systems having the above configuration, interference between GW stations (between feeder links) may increase. For example, as shown in FIG. 16, when a hope signal (desired signal) S1 transmitted from the GW station 70(1) is receiving by the FL antenna 211(1) of the HAPS 20, signals transmitted from the other GW stations 70(2) and 70(3) are received by the FL antenna 211(1) as interference signals I2 and I3. Therefore, SINR characteristics of the feeder link may deteriorate.

Therefore, in the present embodiment, as shown below, by applying a MIMO interference canceller compatible with the line-of-sight environment (LOS: Line-Of-Sight) between GW stations (between feeder links) and reducing interference between GW stations (between feeder links), the SINR characteristics of the feeder link are improved.

Figure 17:
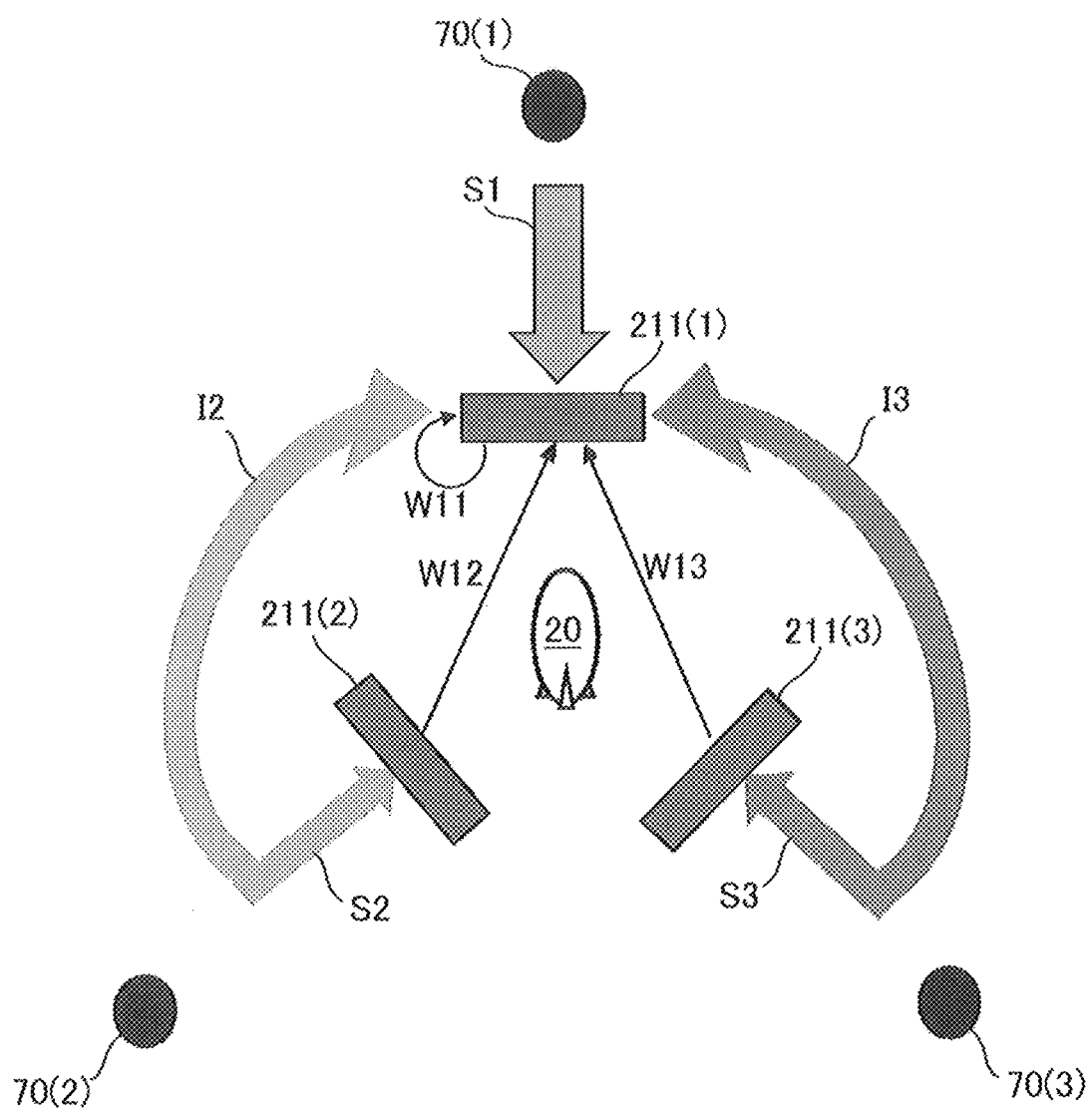
FIG. 17 is an illustration showing an example of a MIMO interference canceller to which the weight W is obtained by an approximate expression and applied.
Figure 18:
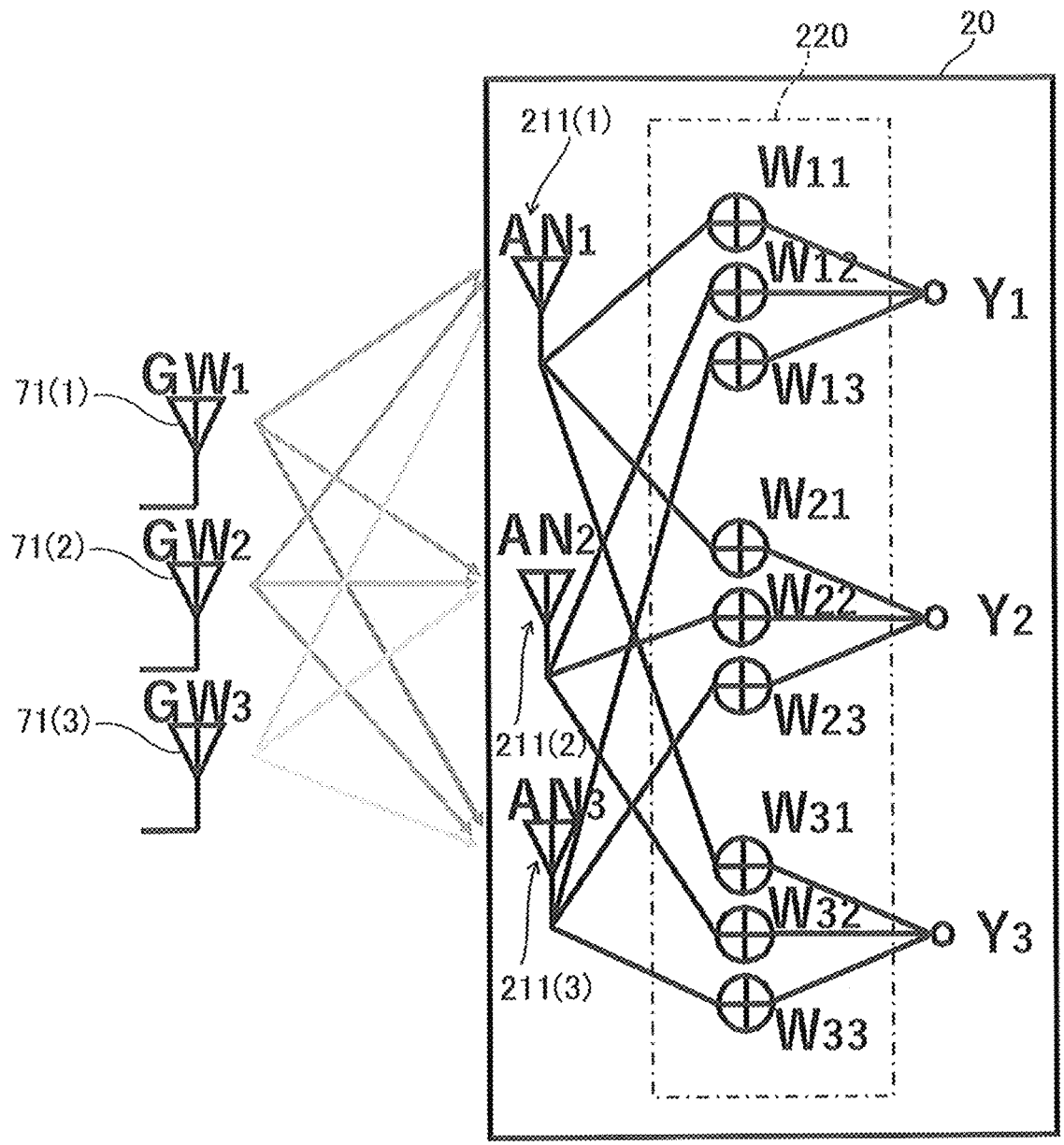
FIG. 18 is an illustration showing an example of a schematic structure of an interference canceller section 220 mounted on a HAPS.

FIG. 17 is an illustration showing an example of a MIMO interference canceller to which the weight W is obtained by an approximate expression and applied. FIG. 18 is an illustration showing an example of a schematic configuration of an interference canceller section 220 mounted on the HAPS 20.

The FL antenna 211(1) of the HAPS 20 receives a hope signal S1(Y11) transmitted from the GW station 70(1), an interference signal I2(Y12) transmitted from the GW station 70(2), and an interference signal I3(Y13) transmitted from the GW station 70(3). The reception signal AN1 is represented by the following equation (1).

$$AN1 = S1 + I2 + I3 \qquad (1)$$

In the interference canceller section 220 of the HAPS 20, by multiplying and subtracting the weights W2 and W3 corresponding to each of the signals S2 and S3 received by the other FL antennas 211(2) and 211(3) as shown in the following equation (2), the hope signal S1(Y11) which canceled the interference signals I2 and I3 can be output. Similarly, the interference signals from other GW stations can be canceled for the hope signals S2(Y22) and S3(Y33) transmitted from the GW stations 70(2) and 70(3).

$$S1 = w11 \cdot AN1 + w12 \cdot AN2 + w13 \cdot AN3 \qquad (2)$$

Figure 19:
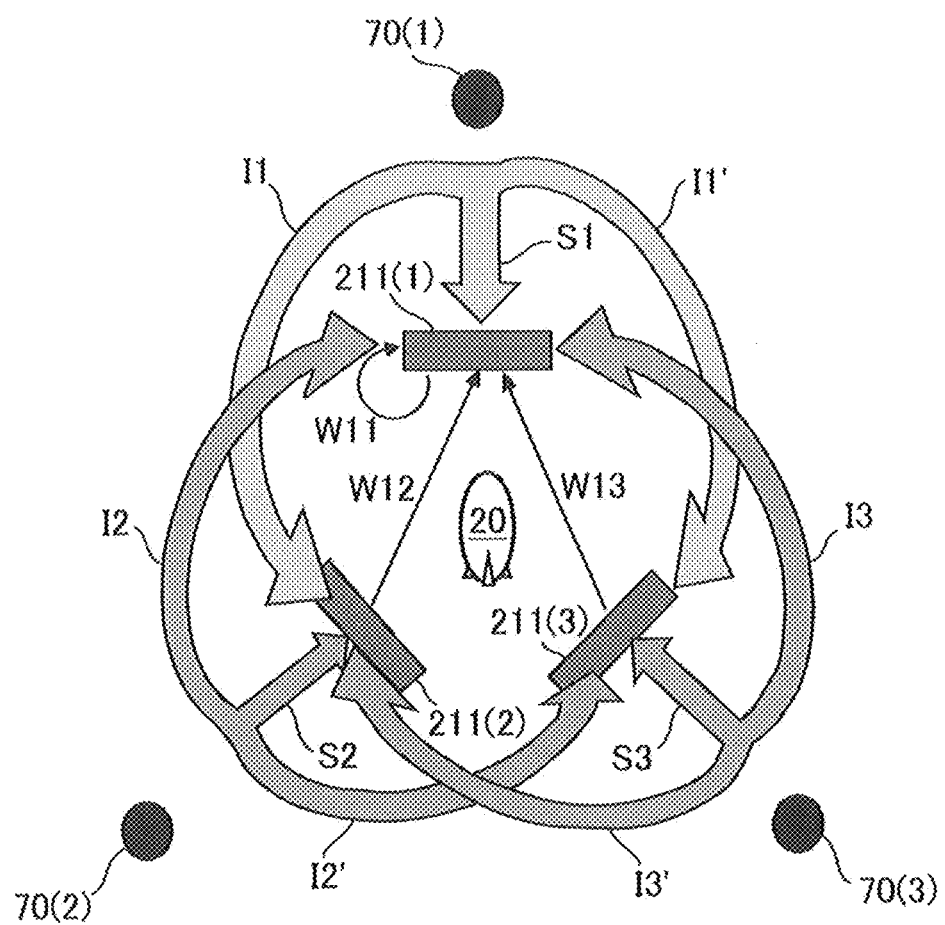
FIG. 19 is an illustration showing an example of a MIMO interference canceller applied by obtaining the weight W by the ZF method.

FIG. 19 is an illustration showing an example of a MIMO interference canceller applied by obtaining a weight W by the ZF (Zero-Forcing) method. For example, a signal transmitted from the GW station 70(1) is not only received as the hope signal S1(Y11) by the FL antenna 211(1) of the HAPS 20, but also received as interference signals I1(Y12) and I1'(Y13) by the FL antennas 211(2) and 211(3). Further, a signal transmitted from the GW station 70(2) is not only received as an interference signal I2(Y21) by the FL antenna 211(1), but also received as an interference signal I2'(Y23) by the FL antenna 211(3). Moreover, a signal transmitted from the GW station 70(3) is not only received as an interference signal I3(Y31) by the FL antenna 211(1), but also received as an interference signal I3'(Y32) by the FL antenna 211(2). In the MIMO interference canceller in FIG. 19, considering these interference signals I1, I1', I2' and I3', the hope signal S1(Y11) is output, for example, as shown in the following equation (3). As a result, the accuracy of interference suppression between GW stations (between feeder links) can be improved.

$$S1 = w11(Y11+Y12+Y13) + w12(Y21+Y22+Y23) + w13(Y31+Y32+Y33) \quad (3)$$

In order to calculate the weight W used for the MIMO interference canceller, it is necessary to grasp a propagation path response H between the FL antennas 211(1) to 211(3) of the HAPS 20. In particular, in the plural GW systems in the present embodiment, since the airframe of the HAPS 20 moves relative to the GW stations 70(1) to 70(3), the propagation path response also changes in accordance with the movement.

Therefore, in the present embodiment, a pilot signal is transmitted from each GW station 70(1) to 70(3) in order to grasp the propagation path response. The frequency band of the pilot signal is a narrow band, and each pilot signal has a different transmission frequency from each other (orthogonal). The relay communication station 210 of the HAPS 20 estimates the propagation path response of the center frequency fc of the transmission signal band of the feeder link based on the pilot signal received from each GW station 70(1) to 70(3), and derives the weight W.

The larger the difference between the frequency for obtaining the weight W and the transmission signal band of the feeder link, the smaller the amount of interference cancellation. For example, in the plural GW systems in FIG. 10 described above, three GW stations 70(1) to 70(3) are installed at every 120°, and three FL antennas 211(1) to 211(3) of the relay communication station 210 of the HAPS 20 are installed at every 120° on the circumference of the radius Δd. Since the airframe of the HAPS 20 generally flies while rotating in the stratosphere, for example, as shown in FIG. 14 described above, the FL antennas 211(1) to 211(3) of the relay communication station 210 control the beam so that the main beam faces the opposing GW stations 70(1) to 70(3). Herein, rotation angle 1 of the airframe of the HAPS 20 is a relative rotation angle with each GW station direction as 0°. With the rotation of the airframe of the HAPS 20, the propagation path (phase mainly due to the difference in path length) of each FL antennas 211(1) to 211(3) on the circumference of the radius Δd changes. Since the weight W is determined by the frequency of the pilot signal (hereinafter referred to as "pilot frequency"), the amount of interference cancellation in a signal band different from the pilot frequency decreases, the larger the frequency difference and the smaller the amount of cancellation.

Figure 20:
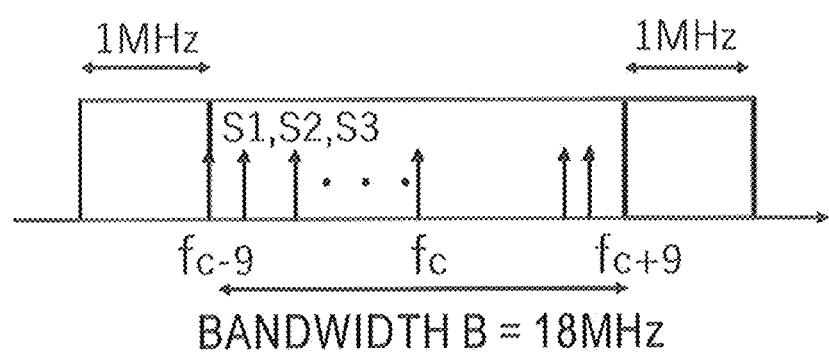
FIG. 20 is an illustration showing an example of a transmission signal band of a feeder link in the plural GW systems according to the embodiment.

The position of the pilot frequency may be, for example, one of the bands (bandwidth: 1 MHz) on both sides of the transmission signal band of the feeder link shown in FIG. 20, or may be the center frequency fc of the transmission signal bandwidth of the feeder link (18 MHz in the example in the figure).

Figure 21:
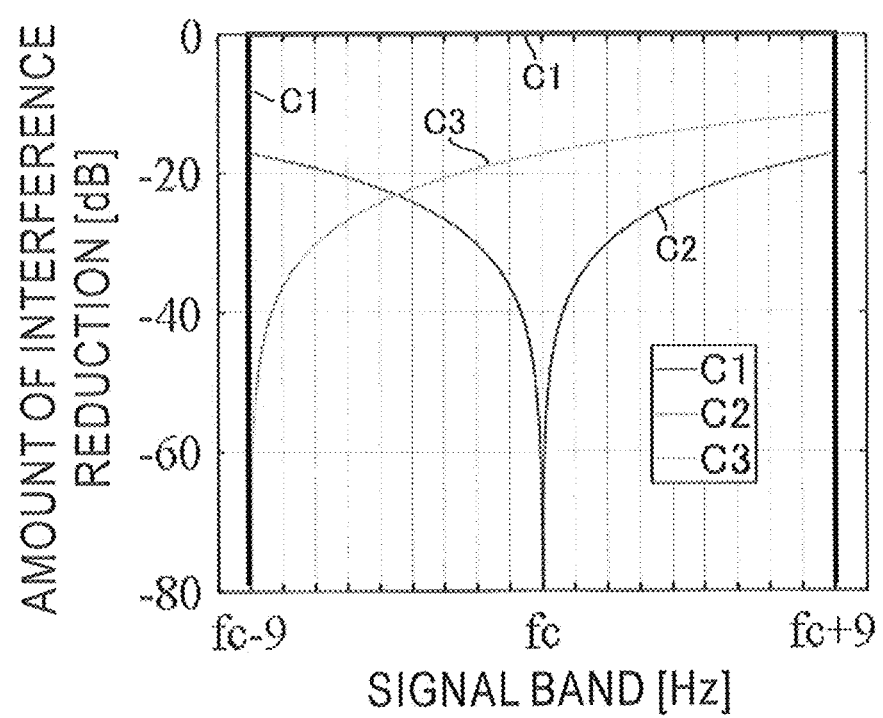
FIG. 21 is a graph showing an example of computer simulation results for evaluating an interference reduction effect when the weights are obtained at different pilot frequencies from each other according to the embodiment.
Figure 22:
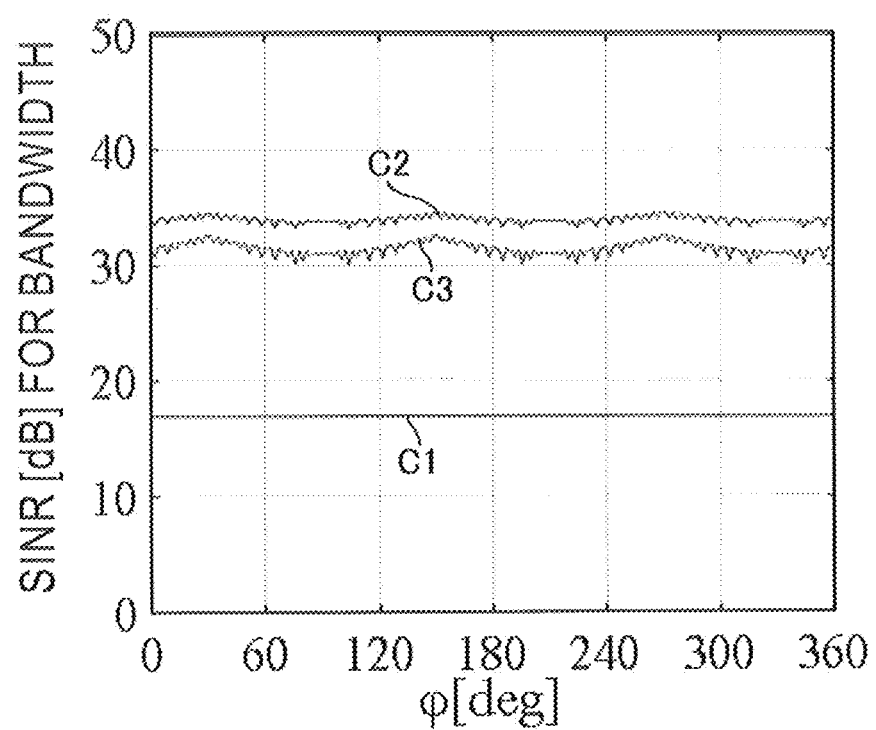
FIG. 22 is a graph showing an example of computer simulation results of SINR characteristics of an entirety of a transmission signal band of a feeder link when an airframe of a HAPS is rotated.

FIG. 21 is a graph showing an example of computer simulation results for evaluating an interference reduction effect when the weights are obtained at different pilot frequencies from each other according to the embodiment. Further, FIG. 22 is a graph showing an example of computer simulation results of SINR characteristics of an entirety of a transmission signal band of the feeder link when the airframe of the HAPS 20 is rotated. The evaluation parameters are shown in Table 1.

TABLE 1

| Evaluation Parameter | Value |
| --- | --- |
| Number of ground stations (GW stations) | 3 |
| Disposed radius R of ground stations (GW stations) | 100 km |
| Number of antennas of HAPS relay communication station | 3 |
| Disposed radius r of antennas of HAPS relay communication station | 0.5 m |
| Carrier frequency | 3.3 GHz |
| Bandwidth B of transmission signals | 18 MHz |
| Gain of antenna | 20 dBi |
| Front-back ratio (F/B ratio) of antenna | 20 dB |
| S/N ratio | 20 dB |

A radius Δd of the FL antenna (relay antenna) 211 is 0.5 [m], a gain of the FL antenna 211 is 20 [dBi], and a front-back ratio (F/B ratio) is 20 [dB]. Assuming that a reception SNR of the relay communication station 210 received by an omnidirectional antenna is 20 [dB], a reception SNR of the relay communication station 210 received by the FL antenna 211 is 40 [dB]. Further, the transmission signal bandwidth of the feeder link is set to 18 [MHz]. As an example, an evaluation is performed in case that the pilot frequency is set at the edge and the center of the transmission signal bandwidth of the feeder link As shown in FIG. 21, it can be seen that the amount of interference reduction in the transmission signal band of the feeder link differs depending on the pilot frequency. In case that the pilot frequency is set to the center of the transmission signal band (C2 in the figure), interference can be reduced over the entirety of the transmission signal bandwidth. Further, in case that the pilot frequency is set to the center of the transmission signal band (C2 in the figure) as shown in FIG. 22, it can be seen that the SINR can be improved by 15 dB or more as compared with the case without the interference canceller.

Figure 23:
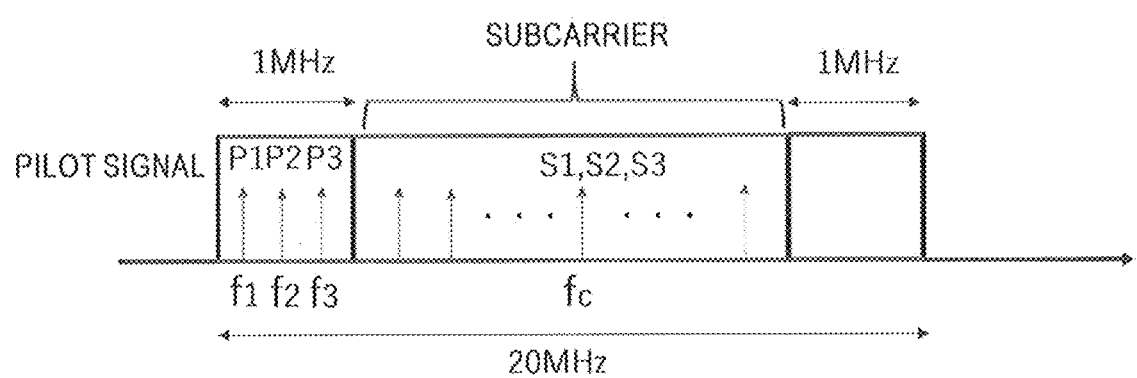
FIG. 23 is an illustration showing an example of a pilot frequency when each of plural GW stations transmits one pilot signal.

FIG. 23 is an illustration showing an example of pilot frequencies f1, f2 and f3 when each of the GW stations 70(1) to 70(3) transmits one pilot signal. In the illustrated example, pilot signals P1, P2 and P3 transmitted from each GW station 70(1) to 70(3) are located in the adjacent band adjacent to the transmission signal band of the feeder link to which the hope signals S1, S2 and S3 are transmitted from the GW stations 70(1) to 70(3) from the low frequency side.

Each of pilot signals P11 and P21 received by the FL antennas 211(1) and 211(2) of the HAPS 20 is represented by the following equations (4) and (5), and the ratio of these signals is represented by the following equation (6).

$$P_{11} = |P_{11}|e^{j2\pi f_1 \frac{d_1}{c}} \quad (4)$$

$$P_{21} = |P_{21}|e^{j2\pi f_1 \frac{d_1+\Delta d_{21}}{c}} \quad (5)$$

$$\frac{P_{21}}{P_{11}} = \frac{|P_{21}|}{|P_{11}|}e^{j2\pi f_1 \frac{\Delta d_{21}}{c}} \quad (6)$$

The d1 in the above equations (4) to (6) is the path length between the GW station 70(1) and the FL antenna 211(1), Δd21 is the difference in path length (path difference) between the GW station 70(1) and each of the FL antennas 211(1) and 211(2), and Δd31 is the difference in path length (path difference) between the GW station 70(1) and each of the FL antennas 211(1) and 211(3). The path length between the GW station 70(1) and the FL antenna 211(2) is represented by d1+Δd21, and the path length between the GW station 70(1) and the FL antenna 211(3) is represented by d1+Δd31.

From the equation (6) mentioned above, the path difference Δd21 can be obtained by the following equation (7). Other path differences such as the path difference Δd31 mentioned above can be obtained in the same manner.

$$e^{j2\pi f_1 \frac{\Delta d_{21}}{c}} = \frac{|P_{11}|P_{21}}{|P_{21}|P_{11}} \tag{7}$$

$$\Delta d_{21} = \frac{c}{j2\pi f_1}\theta = \frac{\lambda_1}{j2\pi}\theta$$

$$\left(\theta は \frac{|P_{11}|P_{21}}{|P_{21}|P_{11}} の位相\right)$$

Using the path differences mentioned above, the propagation path response at the center frequency fc of the transmission signal band of the feeder link can be estimated by the following equation (8).

$$H_{fc} = \begin{bmatrix} P_{11} & P_{11}\frac{|P_{12}|}{|P_{11}|}e^{j2\pi f_c \frac{\Delta d_{12}}{c}} & P_{11}\frac{|P_{13}|}{|P_{11}|}e^{j2\pi f_c \frac{\Delta d_{13}}{c}} \\ P_{22}\frac{|P_{21}|}{|P_{22}|}e^{j2\pi f_c \frac{\Delta d_{21}}{c}} & P_{22} & P_{22}\frac{|P_{23}|}{|P_{22}|}e^{j2\pi f_c \frac{\Delta d_{23}}{c}} \\ P_{33}\frac{|P_{31}|}{|P_{33}|}e^{j2\pi f_c \frac{\Delta d_{31}}{c}} & P_{33}\frac{|P_{32}|}{|P_{33}|}e^{j2\pi f_c \frac{\Delta d_{32}}{c}} & P_{33} \end{bmatrix} \tag{8}$$

Figure 24A:
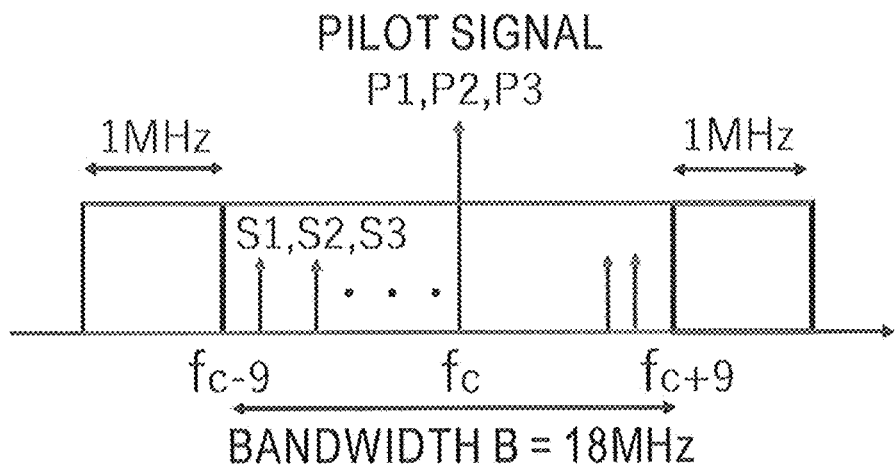
FIG. 24A is an illustration showing another example of a pilot frequency when each of GW stations transmits one pilot signal.
Figure 24B:
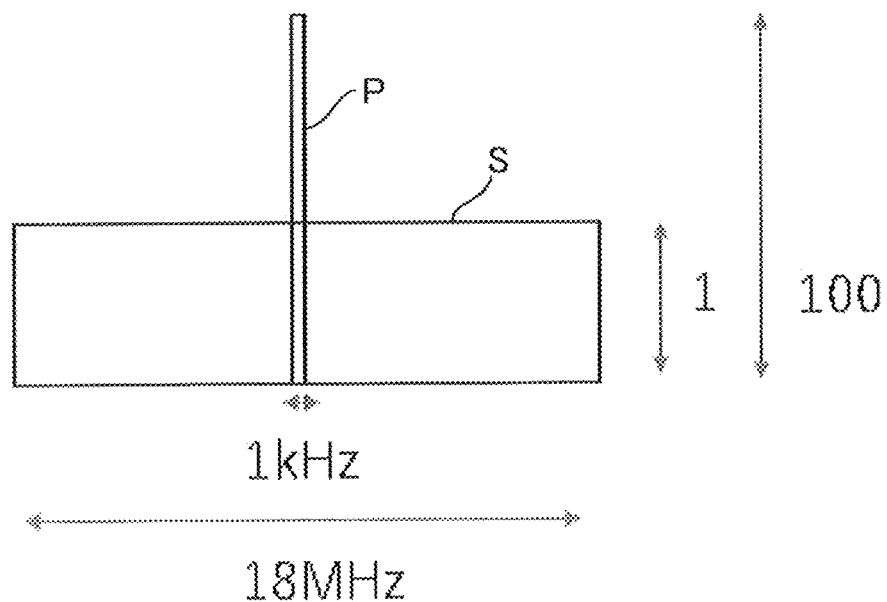
FIG. 24B is an illustration showing an example of a relationship between a power difference and a band difference between a transmission signal of a feeder link and a pilot signal.

FIG. 24A is an illustration showing another example of the pilot frequency when each of the GW stations 70(1) to 70(3) transmits one pilot signal P1, P2 or P3, and FIG. 24B is an illustration showing an example of relationship between a power difference and a band difference between the transmission signal S and the pilot signal P of the feeder link. In the illustrated example, the frequency of each pilot signal P1, P2 and P3 is located near the center frequency fc of the transmission signal band of the feeder link. Each pilot signal P1, P2 and P3 is superimposed on the transmission signal S of the feeder link and transmitted, and on the receiving side, each pilot signal is separated from the transmission signal of the feeder link by a filter and received.

As shown in FIG. 24B, the transmission signal band of the feeder link is 18 [MHz], while the band of the pilot signals P (P1, P2 and P3) is 1 [kHz]. Further, in case that the power of the transmission signal of the feeder link is 1, the power of the pilot signals P (P1, P2 and P3) is 100. In this case, when the pilot signal is the interference signal I, the SN ratio of the transmission signal S of the feeder link is a sufficiently large value of about 60 as shown in the following equation (9), and there is no problem even if narrow band pilot signals P (P1, P2 and P3) are inputted, by an error correction.

$$\frac{S}{I} = \frac{18 \times 10^6 \times 1}{3 \times 1 \times 10^3 \times 100} = 60 \tag{9}$$

In case that the frequency of each pilot signal P1, P2 and P3 is located near the center frequency fc of the transmission signal band of the feeder link as shown in FIG. 24A and FIG. 24B, a matrix $H_{fc}$ of the propagation path response can be derived by the following equation (10).

$$H_{fc} = \begin{bmatrix} P_{11} & P_{12} & P_{13} \\ P_{21} & P_{22} & P_{23} \\ P_{31} & P_{32} & P_{33} \end{bmatrix} \tag{10}$$

Using the matrix $H_{fc}$ of the propagation path response, the weight used for the interference canceller can be calculated by, for example, the ZF (Zero-Forcing) method or the MMSE (Minimum Mean Square Error) method using the matrix of the propagation path response.

For example, in the ZF method, the weight W can be obtained by an inverse matrix of the matrix $H_{fc}$ of the propagation path response as in the following equation (11).

$$W = H_{fc}^{-1} \tag{11}$$

Further, in the MMSE method, the weight W can be used by the following equation (12). Herein, $N_T$ is the number of transmission antennas and γ is the SNR.

$$W = \left(H_{fc}^H H_{fc} + \frac{N_T I_{N_T}}{\gamma}\right)^{-1} H_{fc}^H \tag{12}$$

As described above, according to the present embodiment, it is possible to improve the frequency utilization efficiency of the feeder link while suppressing the decrease in the SNIR of the feeder links of the HAPSs 10 and 20.

It is noted that, the process steps and configuration elements of the radio relay station of the communication relay apparatus such as the HAPSs 10 and 20, the feeder station, the gateway station, the management apparatus, the monitoring apparatus, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (solar plane type)
20 HAPS (airship type)
61 terminal apparatus
70, 70(1) to 70(3) gate way station (GW station)
71, 71(1) to 71(3) antenna for feeder link (GW antenna)
80 mobile communication network
85 management apparatus (management control center, control center)
86 server
90 base station (eNodeB)
110, 210 relay communication station
200C, 200C(1) to 200C(7) three dimensional cell
200F, 200F(1) to 200F(7) footprint
211, 211(1) to 211(3) antenna for feeder link (FL antenna)
212, 212(1) to 212(3) antenna directional beam
213 circular array antenna
214 planar array antenna

The invention claimed is:

1. A system having an aerial-staying type communication relay apparatus that wirelessly communicates with a terminal apparatus, the system comprising plural gateway stations for transmitting and receiving relay signals different from each other on a same frequency in feeder links between the aerial-staying type communication relay apparatus and the plural gateway stations, the plural gateway stations being controlled so as to be in a time synchronization with each other with respect to a transmission timing,
wherein the aerial-staying type communication relay apparatus comprises an interference suppression section that suppresses interference between plural feeder links formed between the plural gateway stations and the aerial-staying type communication relay apparatus,
wherein the plural gateway stations are controlled so as to be in a time synchronization with each other with respect to a transmission timing, and
wherein the interference suppression section:
calculates, for each of the plural gateway stations, a weight for suppressing an interference signal causing an interference, the interference being caused by a transmission signal transmitted from the gateway station and received by a directional beam corresponding to another gateway station, and
subtracts, for each of the plural gateway stations, a reception signal received by a directional beam corresponding to another gateway station multiplied by the weight corresponding to the other gateway station, from the reception signal received by the directional beam corresponding to each of the gateway stations.

2. The system according to claim 1,
wherein each of the plural gateway stations comprises an antenna control section for controlling an antenna for feeder link so as to track the aerial-staying type communication relay apparatus.

3. The system according to claim 1,
wherein the aerial-staying type communication relay apparatus comprises:
an antenna for feeder link having plural directional beams respectively corresponding to the plural gateway stations; and
an antenna control section for controlling the antenna for feeder link so that each of the plural directional beams directs toward a corresponding gateway station.

4. The system according to claim 3,
wherein the antennas for feeder link are a plurality of antennas for feeder link having directional beams in different directions from each other, and
wherein the antenna control section mechanically controls each of the plurality of antennas for feeder link so that each of the directional beams of the plurality of antennas for feeder link is directed toward a corresponding gateway station.

5. The system according to claim 3,
wherein the antenna for feeder link is an array antenna capable of forming the plural directional beams in an arbitrary outward direction centered on a virtual axis in a vertical direction, and
wherein the antenna control section controls amplitudes and phases of transmission/reception signals for the plural antenna elements of the array antenna so that each of the plural directional beams is directed toward a corresponding gateway station.

6. The system according to claim 3,
wherein the antenna for feeder link is a plurality of array antennas capable of forming directional beams in predetermined angle ranges centered on different directions from each other, and
wherein the antenna control section selectively performs a control of amplitudes and phases of transmission/reception signals for plural antenna elements of each of the plurality of array antenna and a switching control of the plurality of array antennas, so that each of the directional beams of the plurality of array antennas is directed toward a corresponding gateway station.

7. The system according to claim 1,
wherein each of the plural gateway stations transmits a pilot signal, and
wherein the interference suppression section:
   estimates a propagation path response by calculating plural path differences between each of the plural gateway stations and the antenna for feeder link of the communication relay apparatus based on a reception result of the pilot signal received from each of the plural gateway stations; and
   calculates plural weights respectively corresponding to the plural gateway stations based on the plural propagation path responses.

8. The system according to claim 7,
wherein the interference suppression section estimates the plural propagation path responses and calculates the plural weights, at a center frequency of a transmission signal band of the feeder link or a frequency around the center frequency.

9. The system according to claim 7,
wherein the plural pilot signals are located in guard bands located on both sides of the transmission signal band of the feeder link.

10. The system according to claim 7,
wherein the plural pilot signals are located at a center frequency of the transmission signal band of the feeder link or a frequency around the center frequency.

11. The system according to claim 7,
wherein the plural pilot signals are transmitted at different frequencies from each other.

12. The system according to claim 7,
wherein the pilot signals are transmitted from each of the plural gateway stations.

13. The system according to claim 7,
wherein each of the plural weights is calculated by the ZF (Zero-Forcing) method or the MMSE (Minimum Mean Square Error) method using a matrix of the propagation path response.

* * * * *